(12) United States Patent
Bartscherer et al.

(10) Patent No.: US 12,664,109 B2
(45) Date of Patent: Jun. 23, 2026

(54) MESSAGE CONVERSION AND MESSAGE PASSTHROUGH BETWEEN DEVICES AND A PROCESSOR IN A MULTI-PANEL COMPUTING DEVICE

(71) Applicant: Intel Corporation, Santa Clara, CA (US)

(72) Inventors: Marko Bartscherer, Cornelius, OR (US); Israel A. Cepeda Lopez, Orangevale, CA (US); Antonio S. Cheng, Portland, OR (US); Ke Han, Shanghai (CN); Manjunatha Kondappa, Folsom, CA (US); Hongjun Li, Shanghai (CN); Xinpeng Sun, Shanghai (CN); Feng Xu, Shanghai (CN); Xiang Ye, Shanghai (CN); Qipeng Zha, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 51 days.

(21) Appl. No.: 18/288,985

(22) PCT Filed: Dec. 16, 2021

(86) PCT No.: PCT/CN2021/138869
§ 371 (c)(1),
(2) Date: Oct. 30, 2023

(87) PCT Pub. No.: WO2023/108553
PCT Pub. Date: Jun. 22, 2023

(65) Prior Publication Data
US 2024/0202147 A1 Jun. 20, 2024

(51) Int. Cl.
*G06F 13/20* (2006.01)
*G06F 3/0354* (2013.01)
(Continued)

(52) U.S. Cl.
CPC .......... *G06F 13/20* (2013.01); *G06F 13/4282* (2013.01)

(58) Field of Classification Search
CPC ...... G06F 13/20; G06F 13/4282; G06F 3/038; G06F 3/03547
(Continued)

(56) References Cited

U.S. PATENT DOCUMENTS 5,935,224 A * 8/1999 Svancarek ............ G06F 13/385
710/63
6,388,591 B1 * 5/2002 Ng ........................ G06F 3/0676
710/60
(Continued)

FOREIGN PATENT DOCUMENTS

CA 2720871 A1 * 10/2009 ............. G16H 40/67
CA 2735233 A1 * 3/2010 ............... G06F 1/16
(Continued)

OTHER PUBLICATIONS

"Embedded USB2 (eUSB2) Physical Layer Supplement to the USB Revision 2.0 Specification," Revision 1.2, Apple Inc., Hewlett Packard Inc., Intel Corporation, Microsoft Corporation, Renesas Corporation, STMicroelectronics, and Texas Instruments copyright 2018, retrieved from https://www.usb.org/document-library/embedded-usb2-eusb2-physical-layer-supplement-usb-revision-20-specification-rev-12 (169 pages).
(Continued)

*Primary Examiner* — Idriss N Alrobaye
*Assistant Examiner* — Henry W Yu
(74) *Attorney, Agent, or Firm* — Alliance IP, LLC

(57) ABSTRACT

A system includes a processor in a lid portion of a computing device. The processor is communicatively coupled to a plurality of input/output (I/O) devices according to a plurality of I/O communication protocols via a first number of
(Continued)

wires. The system includes a first memory coupled to the processor to store instructions that can be executed by the processor and cause the processor to receive, from a first I/O device of the plurality of I/O devices, a first message according to a first I/O communication protocol of the plurality of I/O communication protocols, convert the first message to a second message according to a host communication protocol, and send the second message over a bus containing a second number of wires traversing a hinge movably coupling the lid portion to a base portion of the computing device. The second number of wires is less than the first number of wires.

20 Claims, 17 Drawing Sheets

(51) Int. Cl.

| | | |
|---|---|---|
| *G06F 3/038* | (2013.01) | |
| *G06F 13/40* | (2006.01) | |
| *G06F 13/42* | (2006.01) | |

(58) Field of Classification Search
USPC .......................... 710/2, 15, 30, 62, 105, 300
See application file for complete search history.

(56) References Cited

U.S. PATENT DOCUMENTS

| | | | | |
|---|---|---|---|---|
| 11,206,748 | B2 | 12/2021 | Doddi et al. | |
| 12,117,876 | B2 | 10/2024 | Raju et al. | |
| 12,242,397 | B1 | 3/2025 | Teddy et al. | |
| 2005/0041390 | A1* | 2/2005 | Huang | G06F 1/1616 361/679.46 |
| 2005/0117604 | A1* | 6/2005 | Villefrance | H04L 69/22 370/469 |
| 2007/0228164 | A1 | 10/2007 | Lu et al. | |
| 2009/0094672 | A1 | 4/2009 | Bunger et al. | |
| 2013/0322462 | A1* | 12/2013 | Poulsen | G06F 13/3625 370/458 |
| 2014/0032811 | A1* | 1/2014 | Kanigicherla | G06F 13/12 710/317 |
| 2014/0281113 | A1* | 9/2014 | Trethewey | G06F 13/4022 710/317 |
| 2015/0309954 | A1 | 10/2015 | Moore | |
| 2016/0077842 | A1 | 3/2016 | Turnock et al. | |
| 2018/0189222 | A1 | 7/2018 | Srivastava | |
| 2018/0239728 | A1 | 8/2018 | Emerson et al. | |
| 2019/0042521 | A1 | 2/2019 | Chen et al. | |
| 2020/0057742 | A1 | 2/2020 | Maung et al. | |
| 2021/0056058 | A1* | 2/2021 | Lee | G06F 13/4221 |
| 2021/0218845 | A1 | 7/2021 | Magi et al. | |
| 2026/0003815 | A1 | 1/2026 | Nelson et al. | |

FOREIGN PATENT DOCUMENTS

| | | |
|---|---|---|
| CN | 102136664 A | 7/2011 |
| CN | 104090857 | 10/2014 |

OTHER PUBLICATIONS

"Universal Serial Bus (USB) I3C® Device Class Specification," version 1.1, MIPI Alliance, Inc., Jan. 2023, retrieved from https://www.usb.org/sites/default/files/USB%20I3C%20Device%20Class%20Revision%201.1.pdf (90 pages).

U.S. Appl. No. 18/759,822, filed Jun. 29, 2024.

"Application Note, AN_399, FT260 HID over I2C, Version 1.0," FTDI Chip, May 15, 2018, retrieved from https://ftdichip.com/wp-content/uploads/2020/08/AN_399_FT260_HID-over-I2C.pdf (13 pages).

"Universal Serial Bus (USB), Device class Definition for Human Interface Device (HID)," Firmware Specification Jun. 27, 2001, , retrieved from https://www.usb.org/sites/default/files/documents/hid1_11.pdf (97 pages).

Bhesania, Fred, "HID over I2C Protocol Specification, Device Side, Version 1.00" Microsoft Corporation, Feb. 10, 2016, retrieved from https://view.officeapps.live.com/op/view.aspx?src=https%3A%2F%2Fdownload.microsoft.com%2Fdownload%2F7%2Fd%2Fd%2F7dd44bb7-2a7a-4505-ac1c-7227d3d96d5b%2Fhid-over-i2c-protocol-spec-v1-0.docx&wdOrigin=BROWSELINK (67 pages).

Liming, Sean D. et al., "Industrial PC Requirements to Access GPIO/I2C/SPI/UART from Windows 10 UWP Applications," Jan. 2018, retrieved from http://www.annabooks.com/Articles/Articles_IoT10Core/Windows-10-IoT-microIO-Requirements-on-IA-Rev1.6.pdf (6 pages).

Microsoft Corporation, "Introduction to HID over SPI," Dec. 14, 2021, retrieved from https://docs.microsoft.com/en-us/windows-hardware/drivers/hid/hid-over-spi (3 pages).

Microsoft Corporation, "Introduction to HID over I2C," Dec. 14, 2021, retrieved from https://docs.microsoft.com/en-us/windows-hardware/drivers/hid/hid-over-i2c-guide (2 pages).

Microsoft Corporation, "Architecture and overview for HID over the I2C transport,", Dec. 14, 2021, retrieved from https://docs.microsoft.com/en-us/windows-hardware/drivers/hid/architecture-and-overview (4 pages).

Microsoft Corporation, "Architecture and overview for HID over the SPI transport,", Dec. 14, 2021, retrieved from https://docs.microsoft.com/en-us/windows-hardware/drivers/hid/architecture-and-overview-for-spi (5 pages).

Microsoft Corporation, "Architecture and overview," Dec. 14, 2021, retrieved from https://docs.microsoft.com/en-us/windows-hardware/drivers/hid/architecture-and-overview-for-usb (2 pages).

Microsoft Corporation, "Hid over USB Overview,", Dec. 14, 2021, retrieved from https://docs.microsoft.com/en-us/windows-hardware/drivers/hid/hid-over-usb#/see-also (2 pages).

Microsoft, Inc., "HID over SPI Protocol Specification Version 1.0," Jul. 22, 2021, retrieved from https://www.microsoft.com/en-us/download/confirmation.aspx?id=103325 (47 pages).

PCT International Search Report and Written Opinion issued in PCT/CN2021/138869, dated Aug. 29, 2022; 9 pages.

USB Implementers Forum. (Aug. 2024). Embedded USB2 Version 2.0: Supplement to the USB 2.0 Specification (eUSB2V2). Retrieved from https://www.usb.org/sites/default/files/Embedded%20USB2%20Version%202.0%20Supplement%20to%20the%20USB%202.0%20Specification.pdf (65 pages).

EPO European Extended Search Report in EP Application Serial No. 21967688.9 mailed on Jul. 2, 2025, 8 pages.

U.S. Appl. No. 19/094,364, filed Mar. 28, 2025.

USPTO Non-Final Office Action issued in U.S. Appl. No. 18/759,822, mailed Dec. 29, 2025, 26 pages.

* cited by examiner

DATA PACKET LAYOUT
510

| 1 BYTE | 1 BYTE | 1 BYTE | 1 BYTE | VARIABLE NUMBER OF BYTES |
|--------|--------|--------|--------|--------------------------|
| cmd | type | len | flags | Payload data |

FIG. 5A

DATA PACKET FIELD
DESCRIPTION TABLE
520

| FIELD | SIZE (BYTES) | VALUE | DESCRIPTION |
|-------|--------------|-------|-------------|
| 522 cmd | 1 | SPI:    Z1-Z5 | SPI type, init, read, write, etc. |
| | | I2C:    Y1-Y6 | I2C type, config, read, write, etc. |
| | | GPIO:  X1-X6 | GPIO type, config, read, write, interrupt report, etc. |
| 524 type | 1 | SPI_CMD_TYPE:  3 | SPI cmd |
| | | I2C_CMD_TYPE:  2 | I2C cmd |
| | | GPIO_CMD_TYPE: 1 | GPIO cmd |
| 525 len | 1 | | Payload length, range 0 ~ 59 |
| 526 flags | 1 | ERR_FLAG:    1<<3 | err_flag:  bit 3 -> 1: have error |
| | | | err_flag:  bit 3 -> 0: no error |
| | | CMPL_FLAG: 1<<2 | cmpl_flag: bit 2 -> 1: packet is completed |
| | | | cmpl_flag: bit 2 -> 0: packet is partial |
| | | RESP_FLAG: 1<<1 | resp_flag: bit 1 -> 1: Response cmd |
| | | | resp_flag: bit 1 -> 0: Request cmd |
| | | ACK_FLAG:   1<<0 | ack_flag: bit 0 -> 1: Need response cmd |
| | | | ack_flag: bit 0 -> 0: Don't need response cmd |
| 528 payload | 0~ max_packet_sz | | cmd specific data payload, max size:  60 |

FIG. 5B

GPIO COMMAND AND
PAYLOAD DEFINITION TABLE
530

| GPIO CMD | VALUE | DESCRIPTION |
|---|---|---|
| GPIO_CONFIG | X1 | config gpio controller, payload: GPIO PACKET format |
| GPIO_WRITE | X2 | write gpio, payload: GPIO PACKET format |
| GPIO_READ | X3 | read gpio, payload: GPIO PACKET format |
| GPIO_INT_EVENT | X4 | notify gpio interrupt event, payload: GPIO PACKET format |
| GPIO_INT_MASK | X5 | mask gpio pin interrupts, payload: GPIO PACKET format |
| GPIO_INT_UNMASK | X6 | unmask gpio pin interrupts, payload: GPIO PACKET format |

FIG. 5C

I2C COMMAND AND
PAYLOAD DEFINITION TABLE
540

| I2C CMD | VALUE | DESCRIPTION |
|---|---|---|
| I2C_INIT | Y1 | Initialize and configure I2C controller |
| I2C_XFER | Y2 | Transfer I2C packet, support read/write, payload: I2C_XFER_PACKET |
| I2C_WRITE | Y3 | Write I2C data to I2C bus, payload: I2C_RW_PACKET |
| I2C_READ | Y4 | Read I2C data from I2C bus, payload: I2C_RW_PACKET |
| I2C_STOP | Y5 | Stop I2C transfer, payload: I2C_RW_PACKET |
| I2C_START | Y6 | Start I2C transfer, payload: I2C_RW_PACKET |

FIG. 5D

SPI COMMAND AND PAYLOAD
DEFINITION TABLE
550

| SPI CMD | VALUE | DESCRIPTION |
|---|---|---|
| SPI_INIT | Z1 | Initialize and configure SPI controller, payload: SPI_INIT_PACKET |
| SPI_DEINIT | Z2 | Finalize the SPI controller, payload: SPI_INIT_PACKET |
| SPI_READ | Z3 | Read data from SPI bus, payload: SPI_XFER_PACKET |
| SPI_WRITE | Z4 | Write data from SPI bus, payload: SPI_XFER_PACKET |
| SPI_WRITEREAD | Z5 | Write and read data from bus, payload: SPI_XFER_PACKET |

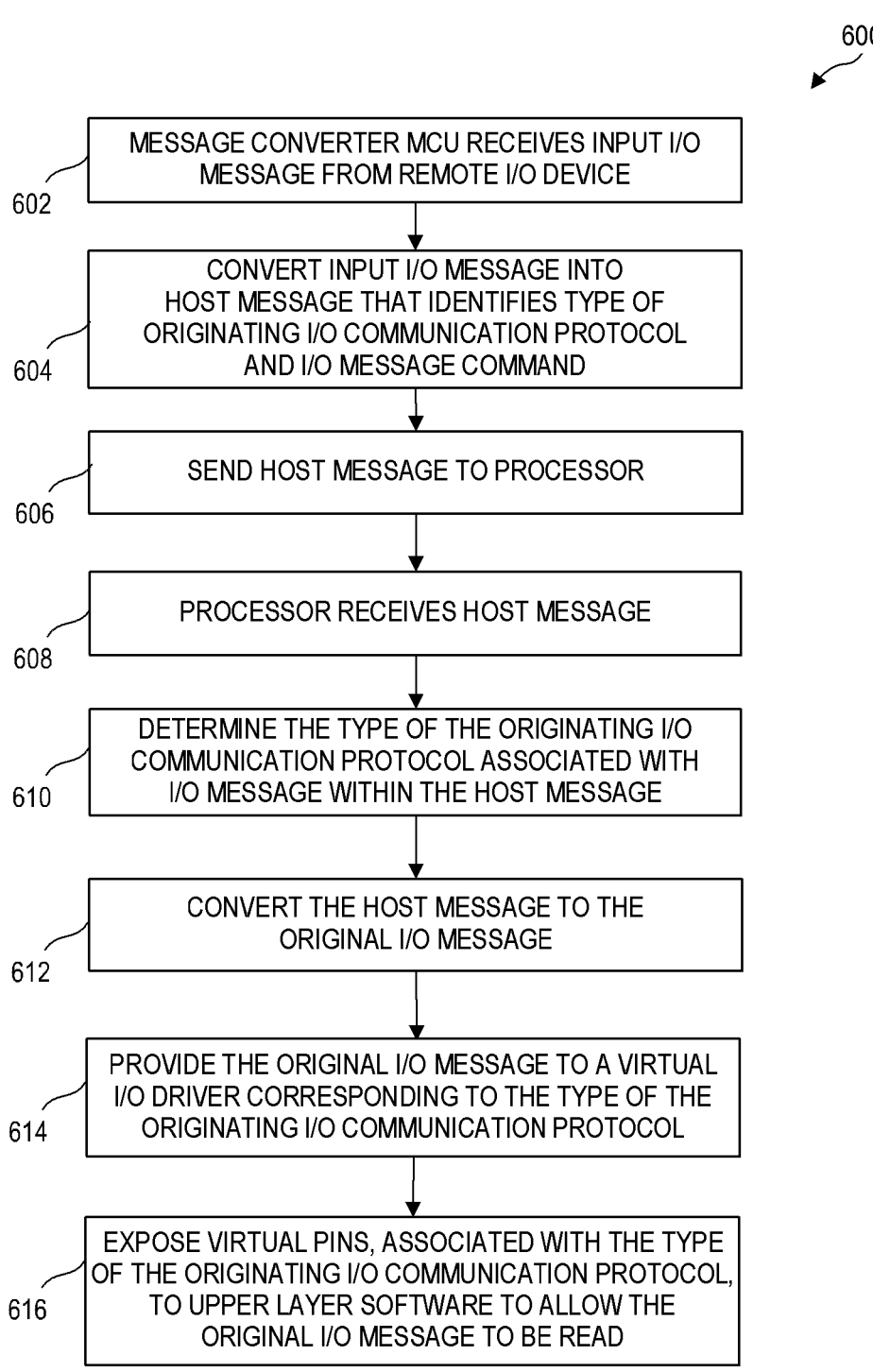

602 — MESSAGE CONVERTER MCU RECEIVES INPUT I/O MESSAGE FROM REMOTE I/O DEVICE

604 — CONVERT INPUT I/O MESSAGE INTO HOST MESSAGE THAT IDENTIFIES TYPE OF ORIGINATING I/O COMMUNICATION PROTOCOL AND I/O MESSAGE COMMAND

606 — SEND HOST MESSAGE TO PROCESSOR

608 — PROCESSOR RECEIVES HOST MESSAGE

610 — DETERMINE THE TYPE OF THE ORIGINATING I/O COMMUNICATION PROTOCOL ASSOCIATED WITH I/O MESSAGE WITHIN THE HOST MESSAGE

612 — CONVERT THE HOST MESSAGE TO THE ORIGINAL I/O MESSAGE

614 — PROVIDE THE ORIGINAL I/O MESSAGE TO A VIRTUAL I/O DRIVER CORRESPONDING TO THE TYPE OF THE ORIGINATING I/O COMMUNICATION PROTOCOL

616 — EXPOSE VIRTUAL PINS, ASSOCIATED WITH THE TYPE OF THE ORIGINATING I/O COMMUNICATION PROTOCOL, TO UPPER LAYER SOFTWARE TO ALLOW THE ORIGINAL I/O MESSAGE TO BE READ

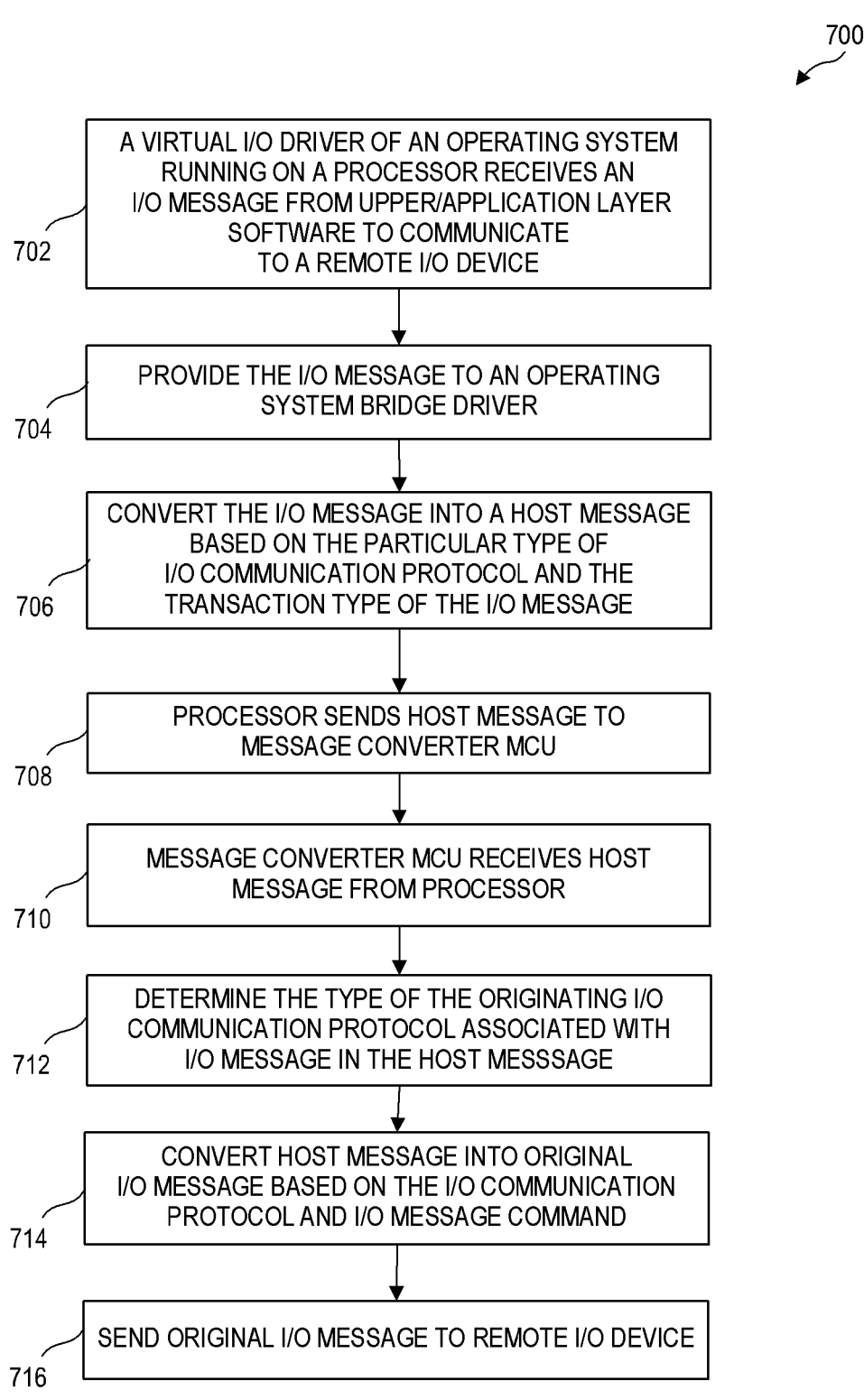

702 — A VIRTUAL I/O DRIVER OF AN OPERATING SYSTEM RUNNING ON A PROCESSOR RECEIVES AN I/O MESSAGE FROM UPPER/APPLICATION LAYER SOFTWARE TO COMMUNICATE TO A REMOTE I/O DEVICE

704 — PROVIDE THE I/O MESSAGE TO AN OPERATING SYSTEM BRIDGE DRIVER

706 — CONVERT THE I/O MESSAGE INTO A HOST MESSAGE BASED ON THE PARTICULAR TYPE OF I/O COMMUNICATION PROTOCOL AND THE TRANSACTION TYPE OF THE I/O MESSAGE

708 — PROCESSOR SENDS HOST MESSAGE TO MESSAGE CONVERTER MCU

710 — MESSAGE CONVERTER MCU RECEIVES HOST MESSAGE FROM PROCESSOR

712 — DETERMINE THE TYPE OF THE ORIGINATING I/O COMMUNICATION PROTOCOL ASSOCIATED WITH I/O MESSAGE IN THE HOST MESSSAGE

714 — CONVERT HOST MESSAGE INTO ORIGINAL I/O MESSAGE BASED ON THE I/O COMMUNICATION PROTOCOL AND I/O MESSAGE COMMAND

716 — SEND ORIGINAL I/O MESSAGE TO REMOTE I/O DEVICE

FIG. 7

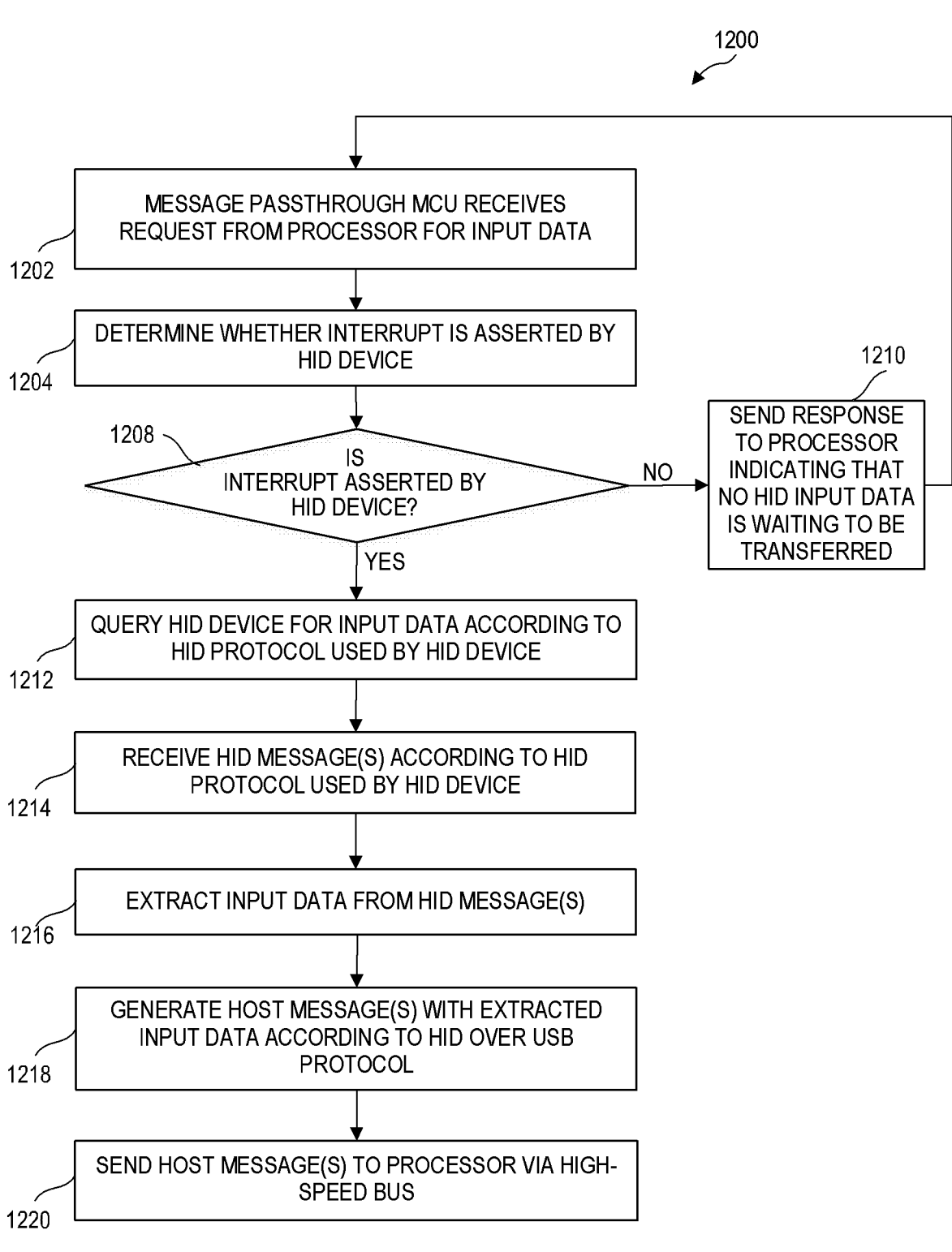

1200

MESSAGE PASSTHROUGH MCU RECEIVES REQUEST FROM PROCESSOR FOR INPUT DATA

1202

DETERMINE WHETHER INTERRUPT IS ASSERTED BY HID DEVICE

1204

1208

IS INTERRUPT ASSERTED BY HID DEVICE?

1210

NO

SEND RESPONSE TO PROCESSOR INDICATING THAT NO HID INPUT DATA IS WAITING TO BE TRANSFERRED

YES

QUERY HID DEVICE FOR INPUT DATA ACCORDING TO HID PROTOCOL USED BY HID DEVICE

1212

RECEIVE HID MESSAGE(S) ACCORDING TO HID PROTOCOL USED BY HID DEVICE

1214

EXTRACT INPUT DATA FROM HID MESSAGE(S)

1216

GENERATE HOST MESSAGE(S) WITH EXTRACTED INPUT DATA ACCORDING TO HID OVER USB PROTOCOL

1218

SEND HOST MESSAGE(S) TO PROCESSOR VIA HIGH-SPEED BUS

MESSAGE PASSTHROUGH MCU RECEIVES
REQUEST FROM PROCESSOR
TO SEND OUTPUT DATA TO HID DEVICE

1302

EXTRACT OUTPUT DATA FROM ONE OR MORE
HOST MESSAGES

1304

GENERATE ONE OR MORE HID MESSAGES FOR HID
DEVICE WITH EXTRACTED OUTPUT DATA ACCORDING
TO HID PROTOCOL USED BY THE HID DEVICE

1306

SEND THE ONE OR MORE HID MESSAGES TO
HID DEVICE

1308

MESSAGE CONVERSION AND MESSAGE PASSTHROUGH BETWEEN DEVICES AND A PROCESSOR IN A MULTI-PANEL COMPUTING DEVICE

CROSS-REFERENCE TO RELATED APPLICATIONS

This is a national stage application under 35 U.S.C. § 371 of PCT International Application Serial No. PCT/CN2021/138869, filed on Dec. 16, 2021 and entitled MESSAGE CONVERSION AND MESSAGE PASSTHROUGH BETWEEN DEVICES AND A PROCESSOR IN A MULTI-PANEL COMPUTING DEVICE. The disclosure of the prior application is considered part of and is hereby incorporated by reference in its entirety in the disclosure of this application.

TECHNICAL FIELD

The present disclosure relates in general to the field of computers, and more specifically, to message conversion and message passthrough between input/output and human interface devices and a processor in a multi-panel computing device.

BACKGROUND

As technology evolves, computing devices with movably coupled panels offer increasingly more features and functionalities. New features and functionalities are often paired with the addition of sensors, cameras, microphones, or other devices in one panel that send messages to a processor in another panel. The panel devices may employ various communication protocols having different wiring requirements to communicate with the processor. Consequently, numerous wires may traverse the hinge to connect the panel devices to the processor. In addition, the trend toward thinner and lighter systems continues to influence the designs of laptops and other computing devices with movably coupled panels. As new devices are added to a lid panel of a laptop to achieve new features and functionalities, for example, the number of wires included in the lid panel and traversing the hinge increase. This can add to the difficulty of implementing new features and functionalities in a laptop without increasing the bulk, size, and complexity of the new design.

BRIEF DESCRIPTION OF THE DRAWINGS

FIGS. 5A-5E are tables defining an example universal serial bus (USB) to input/output conversion protocol that may be used in one or more embodiments of a message conversion system.

FIG. 6 is a flowchart illustrating an example process associated with a message conversion system in a computing device according to at least one embodiment.

FIG. 7 is a flowchart illustrating another example process associated with a message conversion system in a computing device according to at least one embodiment.

FIG. 12 is a flowchart illustrating an example process associated with a HID message passthrough system according to at least one embodiment.

DETAILED DESCRIPTION

Figure 1:
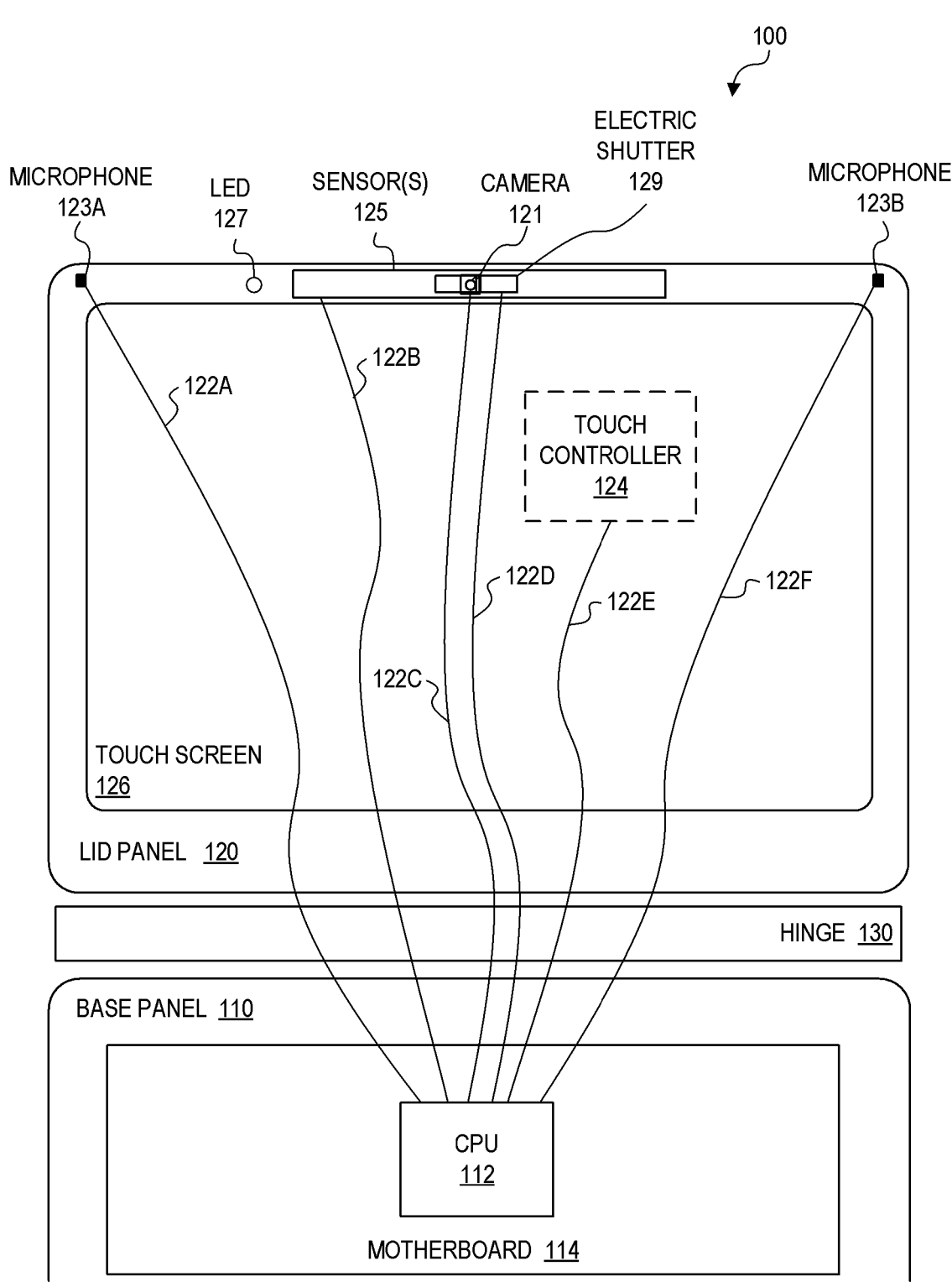
FIG. 1 is a block diagram illustrating a typical wire configuration for input/output devices located in a lid panel of a computing device and a central processing unit (CPU) in a base panel of the computing device.

The present disclosure provides various possible embodiments, or examples, of systems, methods, and apparatuses including a conversion system for messages between input/output (I/O) devices in a lid panel of a computing device and a processor in another panel of the computing device. Generally, the embodiments of message conversion systems disclosed herein may be implemented in a computing device including a lid panel movably coupled to a base panel. In at least one embodiment, messages from I/O devices that are disposed in the lid panel and use various communication protocols are converted to packets based on a higher speed communication protocol that uses fewer total wires. For example, the higher speed communication protocol could be the universal serial bus (USB). Packets that are generated using original I/O messages from an I/O device may be sent to a processor in the base panel of the computing device. The processor in the base panel is expecting messages based on the communication protocol used by the I/O device. Accordingly, the packets sent to the processor can be converted back to the original I/O messages according to the communication protocol used by the I/O device. I/O devices in the lid panel may use various communication protocols including, but not necessarily limited to, inter-integrated circuit (I2C), serial peripheral interface (SPI), general peripheral input/output (GPIO), and/or hardware interface device (HID).

To better understand the techniques of the various embodiments in this disclosure, the following contextual information related to the challenges of implementing remote input/output devices in a multi-panel computing device. In typical laptop designs that include a base panel and at least one lid panel, multiple I/O devices (e.g., microphone, camera, electric shutter, sensors, touch controller, etc.) are placed in the lid panel to perform a variety of functions and enable features of the computing system. Generally, a lid panel is intended to mean a member or portion (e.g., lid portion) of a computing device in which a screen for displaying electronic information or content is disposed. A base panel is intended to mean a member or portion (e.g., base portion) of a computing device in which computing hardware (e.g., processor, CPU, motherboard, SOC, etc.) is disposed. A screen may or may not be disposed in a base panel.

As used in this specification, "input/output device" or "I/O device" is intended to include any device that is communicatively coupled to a processor and that can communicate with the processor. An I/O device can be capable of sending messages to the processor (output), receiving messages from the processor (input), or both. In this specification, references to a "remote I/O device" are intended to mean a given device that is implemented in a panel, member, or other portion of a computing device (e.g., laptop, dual display device, foldable device, etc.) that is coupled to another panel, member, or other portion that contains a processor to which the given device is communicatively coupled. Messages that are communicated between an I/O device and a processor may depend on the particular communication protocol that is used, and may include one or more of read/write data, configuration information, initialization information, interrupts or interrupt-related information, data transfer start information, data transfer stop information, other data transfer information, etc., or any suitable combination thereof.

Various protocols may be used to communicate messages from the different I/O devices in the lid panel to a processor in the base panel, and at least sometimes vice-versa. Consequently, numerous wires typically traverse a hinge connecting the I/O devices in the lid panel to a processor in the base panel. Common protocols used for communications between a processor and remote I/O devices may include, but are not necessarily limited to, I2C, SPI, and GPIO. These communication protocols are used to transport low-speed input/output (I/O) signals across their respective communication links (e.g., I2C bus, SPI bus, GPIO wire(s)) to the processor. High speed I/O buses, such as universal serial bus (USB), may not be used because multiple high-speed I/O buses can be a drain on power and can impact the temperature in the computing device. One example high-speed USB protocol transfers data at 480 mega bits per second (Mbps).

A general description of I2C, SPI, GPIO, and USB protocols is now provided. An inter-integrated circuit (I2C) is a multi-controller/multi-target, packet-switched, single-ended, serial communication bus that is often used to attach lower-speed remote I/O devices (e.g., peripherals, sensors, touch controllers, etc.) in a computing device to a processor (e.g., a microcontroller, etc.) in the computing device. The I2C bus may contain two bi-directional wires, a serial data line (SDA) and a serial clock line (SCL), which are connected to all devices on the I2C bus. The devices on the I2C bus are either a controller device or a target device. Typically, one controller device and one or more target devices are connected to the I2C bus. The I2C protocol can use a 7-bit or 10-bit address space, and each device can have an address.

In I2C, the controller device (e.g., a processor) is used to drive the SCL clock line, which is used to synchronize data transfers over the I2C bus, and to initiate communication with target devices. Target devices (e.g., small peripherals, touch controllers, etc.) respond to the controller device and may use the SDA wire to transmit data (e.g., in the form of messages) to the controller device. Data is transferred in sequences of eight (8) bits on the SDA line. I2C protocol defines three types of transactions that each begin with a start sequence and a stop sequence: (1) single message where a controller device writes data to a target device; (2) single message where a controller device reads data from a target device; and (3) multiple messages where a controller device issues at least two reads or writes to one or more target devices.

A serial peripheral interface (SPI) is a full-duplex synchronous serial communication interface bus that is often used to attach lower-speed remote I/O devices (e.g., small peripherals, sensors, touch controllers, etc.) in a computing device to a processor (e.g., microcontroller, etc.) in the computing device. The devices on the SPI bus include a single controller device and one or more target devices. The SPI bus includes four wires to carry four logic signals, which include a serial clock (SCLK), a data output from controller (MOSI), a data input from target (MISO), and a chip select (CS). While the SCLK, MOSI, and MISO lines can be shared by the two or more target devices, each target device may include a unique CS line that connects to the controller device.

A variety of protocol options are available for an SPI bus, which lacks a formal standard. An SPI bus can transport a certain number of bits at a time. For example, some devices transmit 8 bits (i.e., 1 byte) at a time, and some devices transmit 16 bits (i.e., 2 bytes) at a time. The full-duplex SPI bus allows bits of data to be communicated from a controller device to a target device and vice versa at the same time. Using shift registers, bits can be shifted out of a controller device and into a target device, and at the same time, bits can be shifted out of the target device and into the controller device.

A general purpose input/output (GPIO) is a signal pin (or interface) used to connect microcontrollers, such as a processor in a base panel of a computing device, to other electronic devices, such as remote I/O devices in a lid panel of a computing device. The purpose and behavior of a GPIO pin is customizable and can be controlled by software. GPIOs may be used for many different functions including, for example, controlling or monitoring other circuitry on a board, reading states of switches on a board, driving light-emitting diodes (LEDs) as status indicators, or as an interrupt for a device. In some examples, GPIO pins can be used in parallel with a bus of another protocol such as I2C or SPI. For example, a camera may use an I2C bus to transmit imaging data to the processor, in addition to two GPIO pins. One GPIO pin may be used to power the camera up/down and another GPIO pin may be used to drive a light-emitting diode (LED) to indicate whether the camera is activated.

As new devices are added to a lid panel of a multi-panel computing device to support new features and functionalities, for example, the number of wires included in the lid panel, and traversing the hinge, increase. Adding wires increases the bulk, size, and complexity of a new design. Consequently, the greater the number of wires traversing the hinge, the greater the difficulty of adding new features and functionalities becomes. It should be noted that a computing device with a non-screen panel that contains remote I/O devices with numerous wires connecting the remote I/O devices to the processor in the base panel, could similarly increase the bulk, size, and complexity of a multi-panel computing device.

FIG. 1 is a block diagram illustrating a typical wire configuration for remote I/O devices located in a lid panel of a laptop computer 100 and a computer processing unit (CPU) in a base panel of the laptop computer. As shown in FIG. 1, in current laptop designs, a common approach is to put a motherboard 114 and a central processing unit (CPU) 112 on a base panel 110. A lid panel 120, however, typically contains many I/O devices. Examples of such devices may include, but are not necessarily limited to, a camera 121 (e.g., Mobile Industry Processor Interface (MIPI) camera), microphones 123A and 123B, one or more sensors 125, a light emitting diode (LED) 127, and an electric shutter 129. In addition, a human interface device (HID), such as a touch screen 126 with a touch controller 124, may also be disposed in lid panel 120. A HID device may include any device (typically hardware) that is configured to receive human input that interacts with a computing device and may provide output. Examples include, but are not limited to, a touch screen, keyboards and pointing devices, manual panel controls, simulation devices, webcams, gaming controllers, etc. These examples are not exhaustive and it should be appreciated that any other peripheral devices, sensing modules, human interface devices, or any combination thereof may be added to a lid panel of a laptop to support desired features and functionalities. All these I/O devices and HID devices connect to CPU 112 in the base panel 110, and their wires 122A-122F are required to traverse a hinge 130 that connects the base panel 110 and the lid panel 120.

Even computing devices with fewer remote I/O devices than shown in laptop computer 100 can require numerous wires traversing a hinge, such as hinge 130. Different communication protocols can require different numbers of pins corresponding to wires that traverse the hinge. By way of example, SPI protocol can use four communication pins. I2C protocol can use two communication pins. Any number of GPIO communication pins may be used depending on the particular remote I/O device.

In an example, a computing device with two cameras (e.g., camera 121), an electric shutter (e.g., electric shutter 129), and a visual sensing module (e.g., sensor 125) could use various communication protocols to communicate with a processor (e.g., CPU 112). In one possible scenario, the two cameras may each use I2C protocol with one GPIO pin, totaling three pins for each camera. The electric shutter may use two GPIO pins. The visual sensing module may use SPI protocol with two GPIO pins, totaling six pins. Additionally, four other GPIO pins may be utilized for other common communications. Accordingly, this combination of remote I/O devices and pins could potentially require eighteen (18) wires (e.g., 1×SPI, 2×I2C, 10×GPIO) to extend across the hinge (e.g., hinge 130).

The wires that traverse a hinge typically need special protection since the hinge is a moveable part. Accordingly, large numbers of wires can increase the overall cost of the computing device. Furthermore, an increasing number of wires on the board in lid panel 120 leads to more difficulty in achieving objectives and desirable characteristics of the lid design, such as a thin bezel and thin display. Thus, new designs for computing devices to reduce the number of wires across a hinge of the computing device are needed to make other design objectives (e.g., thin bezel, thin display, etc.) possible.

Laptop and other multi-panel designs increasingly also support touch screens and the use of styluses. With reference to laptop 100 as an example, touch screen 126 is operably coupled to touch controller 124, which is added to lid panel 120 to handle touch screen and stylus events. Because CPU 112 and motherboard 114 are in base panel 110, touch controller 124 connects to CPU 112 through an I2C bus or an SPI bus and the associated wires traverse hinge 130. Generally, an I2C touch controller uses six pins (e.g., common collector voltage (VCC), ground (GND), serial data line (SDA), serial clock line (SCL), RESET, INTERRUPT), while an SPI touch controller uses eight to ten pins (e.g., VCC, GND, data output from target (MISO), data output from controller (MOSI), chip select (CS), serial clock (CLK), RESET, INTERRUPT, and two GPIO pins such as P103 and P104). Thus, anywhere from six to ten wires may traverse hinge 130 for a touch screen. Like with the wires from other hardware devices, the wires from touch controller 124 also need special protection since the hinge is a moveable part. For an SPI touch controller in particular, reducing high frequency noise cross hinge 130 can be especially difficult.

One or more embodiments of a message conversion system as disclosed herein may be implemented in a computing device including a lid panel movably coupled to a base panel. The base panel and lid panel may be connected via a hinge coupling or other suitable means allowing movement of the lid panel relative to the base panel. In one example message conversion system, messages from remote I/O devices in the lid panel using various communication protocols are converted, based on the universal serial bus (USB) protocol, to packets that are sent to a processor in the base panel. The remote I/O devices in the lid panel may use various communication protocols including, but not necessarily limited to, inter-integrated circuit (I2C), serial peripheral interface (SPI), and/or general peripheral input/output (GPIO). The processor can be configured to convert the USB packets back to the messages based on their original respective protocols. In reverse, the processor may send packets based on the USB protocol to remote I/O devices in the lid panel, and the packets are converted to messages based on the appropriate I/O protocol of the respective remote I/O devices. In at least one embodiment, a USB microcontroller may be added in the lid panel and configured to communicate to the remote I/O devices via low-speed I/O protocols and to the processor via the USB protocol, and to perform the appropriate conversion based on which remote I/O device is communicating with the processor.

With this example message conversion system, the number of wires extending from one panel of a computing device to another panel of the computing device can be significantly reduced depending on the particular features of the computing device and the remote I/O devices implemented to support those features. As previously described, in a computing device with 18 wires traversing a hinge to provide communication paths from remote I/O devices to a processor, the number of wires can be reduced by fourteen (e.g., from 18 SPI/I2C/GPIO wires to 4 USB wires). Such a decrease in pins across the hinge of laptops provides significant industrial design value and bill of materials cost reduction to produce the computing device.

Figure 2:
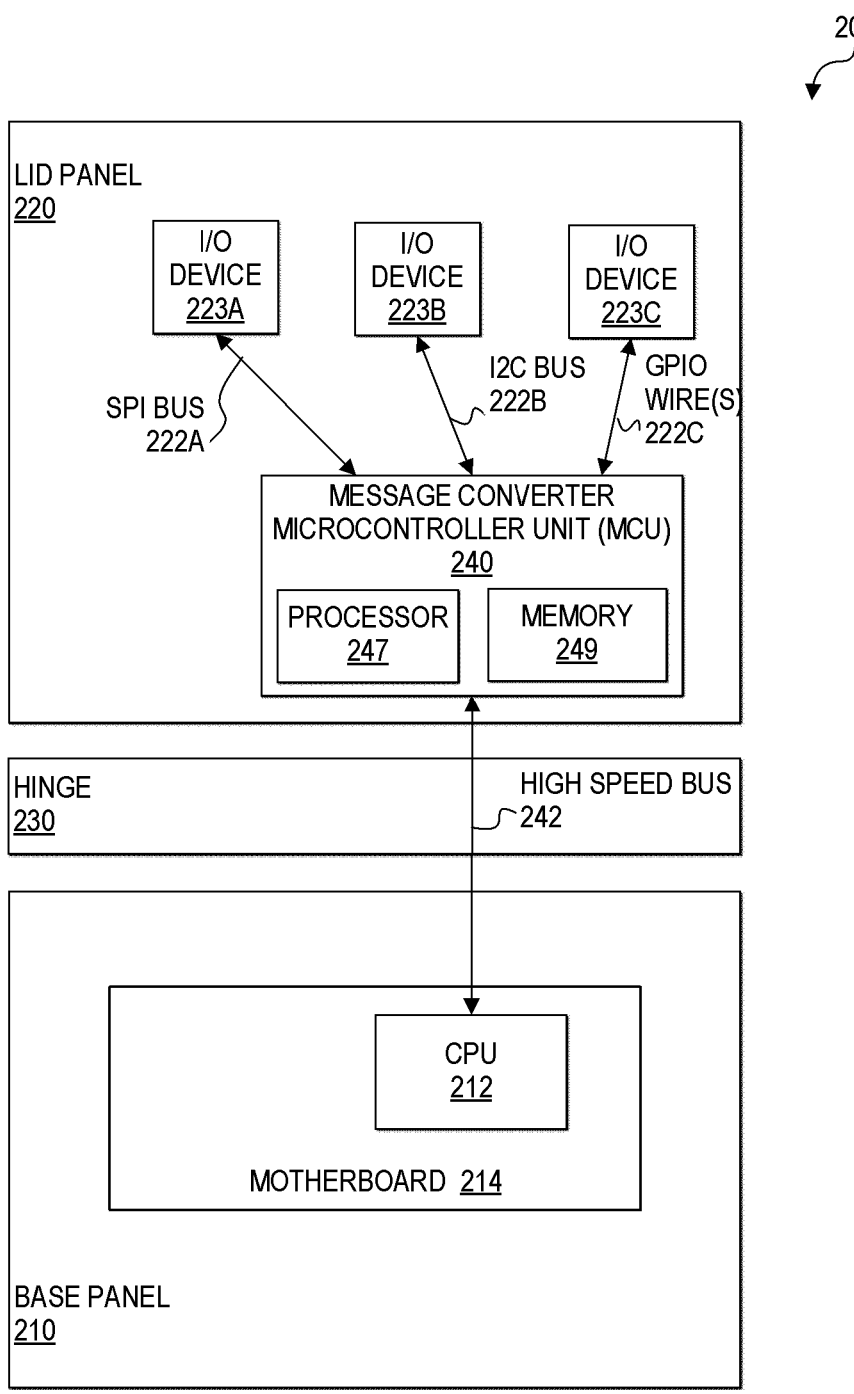
FIG. 2 is a block diagram illustrating a first example computing device comprising a message conversion system in a computing device according to at least one embodiment.

FIG. 2 is a block diagram illustrating an example computing device 200 comprising a message conversion system to reduce the number of pins across a hinge 230 of the computing device according to at least one embodiment. Computing device 200 includes a base panel 210 and a lid panel 220 connected by hinge 230. Base panel 210 can include a central processing unit (CPU) 212 connected to, or integrated with, other computer components on a motherboard 214 (e.g., an electronic circuit board integrating and/or connecting components of a computer) in base panel 210. Lid panel 220 can include multiple remote I/O devices 223A-223B (e.g., cameras, microphones, electric shutters, sensors, etc.). Remote I/O devices 223A, 223B, and 223C may communicate with CPU 212 using various communication protocols such as SPI, GPIO, and I2C, respectively.

Communication protocols such as SPI, I2C, and GPIO can be used to transport low-speed input/output (I/O) signals across their respective communication channels including an SPI bus 222A, an I2C bus 222B, and GPIO wire(s) 222C. Accordingly, in one or more embodiments, these signals (also referred to herein as 'messages') can be converted into high-speed I/O signals (also referred to herein as 'messages' or 'packets') based on universal serial bus (USB) protocol. Once converted, the USB packets can be transmitted across hinge 230 to CPU 212. At CPU 212, the received USB packets may be converted back to the original messages according to the appropriate I2C, GPIO, or SPI communication protocol.

As used herein, 'message' is intended to mean any information or data that is transmitted, sent, or otherwise communicated from one component or device (e.g., I/O devices, microcontrollers, processors, human interface devices, microprocessors, system-on-a-chip, CPU, etc.) to another component or device in a computing device or system. A message may take the form or format of a particular communication protocol including, but not necessarily limited to, a packet of information or data having a particular format, or a digital signal such as a level trigger (e.g., at high or low level) or a falling or rising edge trigger.

In at least one embodiment, any suitable hardware, firmware, and/or software may be provided in lid panel 220 to function as a bridge that connects remote I/O devices 223A-223C in lid panel 220 over another communication protocol using fewer wires to CPU 212 in base panel 210. The hardware, firmware, and/or software may be embodied as any suitable integrated circuit that can perform I/O message conversion operations disclosed herein and that is sized for placement in a lid panel of the computing device. In one example, a message converter microcontroller unit (MCU) 240 may be embedded in the lid panel 220 of computing device 200 to perform the I/O message conversion operations. In other embodiments, other components that implement suitable communication protocols (e.g., USB, PCIe, etc.) to communicate with the CPU in the base panel may be leveraged with appropriate firmware and/or software to bridge I/O devices in the lid panel through those other components to the CPU in the base panel.

Message converter MCU 240 can include a processor 247 and memory 249. Generally, processor 247 may be any suitable single or multi-core processor comprising circuitry to process instructions that drive the MCU 240. Processor 247 may access data and code (e.g., firmware and/or software) from memory 249. In at least one example architecture of MCU 240, memory 249 may be an internal physical memory such as, for example, random access memory (RAM), dynamic random access memory (DRAM), synchronous dynamic random access memory (SDRAM), static random access memory (SRAM), read-only memory (ROM), programmable ROM (PROM), erasable PROM (EPROM), electrically EPROM (EEPROM), or other types of machine-readable storage media that are capable of storing data and information. In some examples, message converter MCU 240 may include any other suitable elements such as a clock (e.g., oscillator) and I/O interfaces, where each I/O interface is a connecting point between the message converter MCU 240 and another entity, such as one of the I/O devices 223A-223C or CPU 212, based on a particular communication protocol.

In one or more embodiments, message converter MCU 240 can be communicatively coupled to remote I/O devices 223A, 223B, and 223C through a plurality of interfaces based on communication protocols SPI, I2C, and GPIO, respectively. Each interface of the plurality of interfaces for I/O devices can include one or more pins on the MCU depending on the particular requirements of the communication protocol for that interface. Message converter MCU 240 is configured to send messages to and/or receive messages from remote I/O devices 223A, 223B, and 223C over SPI bus 222A, I2C bus 222B, and GPIO wire(s) 222C, respectively. An appropriate number of pins may be provided in message converter MCU 240 to facilitate communication to and from each remote I/O device based on the communication protocol used by that remote I/O device to communicate with CPU 212. For example, SPI bus 222A may contain six to ten wires and six to ten corresponding pins may be provided in MCU 240, where two wires carry power and ground signals, and four to six wires carry communication signals according to the SPI protocol. I2C bus 222B may contain four wires and four corresponding pins may be provided in MCU 240, where two wires carry power and ground signals, and two other wires carry communication signals according to the I2C protocol. One (or more) pins may be provided in message converter MCU 240 with one or more corresponding wires to connect to I/O device 223C to enable communication according to the GPIO protocol. The number of pins and corresponding wires to connect to GPIO device 223C may vary depending on the implementation and the particular information to be communicated.

Message converter MCU 240 can also be connected to CPU 212 using the USB communication protocol. Message converter MCU 240 is configured to send messages to and/or receive messages from CPU 212 using high-speed bus 242. USB communication protocol enables a processor (e.g., 212) to communicate with peripheral devices and other devices (e.g., sensors, touch screen controllers, etc.).

Message converter MCU 240 may be configured to convert received messages of one protocol to output messages of another protocol. For example, message converter MCU 240 can receive a message that is sent using a low-speed protocol (e.g., SPI, I2C, or GPIO) from an I/O device 223A, 223B, or 223C, convert the received message to a message based on a high-speed protocol (e.g., universal serial bus (USB)), and then send the converted message to CPU 212 via a high-speed bus 242 (e.g., USB bus). Thus, in the example of FIG. 2, remote SPI, I2C, and GPIO messages can be communicated over USB to CPU 212 across hinge 230. Conversely, for remote I/O devices that receive data from a processor, message converter MCU 240 can receive a message based on a high-speed protocol (e.g., USB) from CPU 212, convert the received message to a message based on a low-speed protocol (e.g., SPI, I2C, or GPIO), and then send the converted message via a low-speed bus or wire(s) (e.g., SPI bus 222A, I2C bus 222B, or GPIO wire(s) 222C) to the appropriate remote I/O device 223A, 223B, or 223C.

Regarding the USB communication protocol, generally, a USB system includes a host, a device, and a bus that connects the host to the device to enable communication therebetween. In one example, CPU 212 may be configured as the USB host, message converter MCU 240 may be configured as the USB device, and high-speed bus 242 may be configured as the USB bus that connects CPU 212 to message converter MCU 240 to enable communication therebetween.

One version of a USB bus can include two wires for power (e.g., VCC and ground) and a pair of wires to carry the data. In some implementations, an alternative USB bus version can be used that includes six wires for data. Generally, any number of wires to carry data that is supported by the USB specification and is less than some aggregated number of wires needed for the remote I/O devices using other protocols (e.g., SPI, I2C, GPIO, etc.) may be used. In one example implementation of a message conversion system, message converter MCU 240 may be provided with four pins to communicate with CPU 212 according to the USB protocol and the USB version (e.g., USB 2.0) using four wires.

Packets are used to communicate data and other information over the USB wires. A USB transaction can include a token packet (e.g., defines what follows in the transaction), one or more data packets (e.g., the payload), and potentially a status packet (e.g., to acknowledge transactions and allow error correction). Transaction types can include IN-Read and OUT-Write transactions. For the USB host (e.g., CPU 212) to receive data from the USB device (e.g., MCU 240), such as CPU 212 receiving data from message converter MCU 240, the USB host first sends an appropriate host token packet, the USB device responds by sending one or more data packets to the USB host, and the USB host may respond by sending a status packet back to the USB device. The USB host can send data to the USB device, such as CPU 212 sending data to message converter MCU 240, by the USB host first sending an appropriate token packet to the USB device, and then sending one or more data packets to the USB device. The USB device may respond by sending a status packet back to the USB host.

It should be noted that other communication protocols may be used to connect a remote I/O device to CPU 212 and may be incorporated into one or more embodiments. One example includes universal-asynchronous receiver-transmitter (UART). Accordingly, UART could be used to connect a remote I/O device to message converter MCU 240, and message converter MCU 240 could be configured to convert UART messages to USB messages and to convert USB messages to UART messages. Similarly, any other suitable high-speed, low wire communication protocol may be used enable communication from message converter MCU 240 to CPU 212 across hinge 230. It should also be noted that some I/O devices may include multiple communication channels using different communication protocols.

Figure 3:
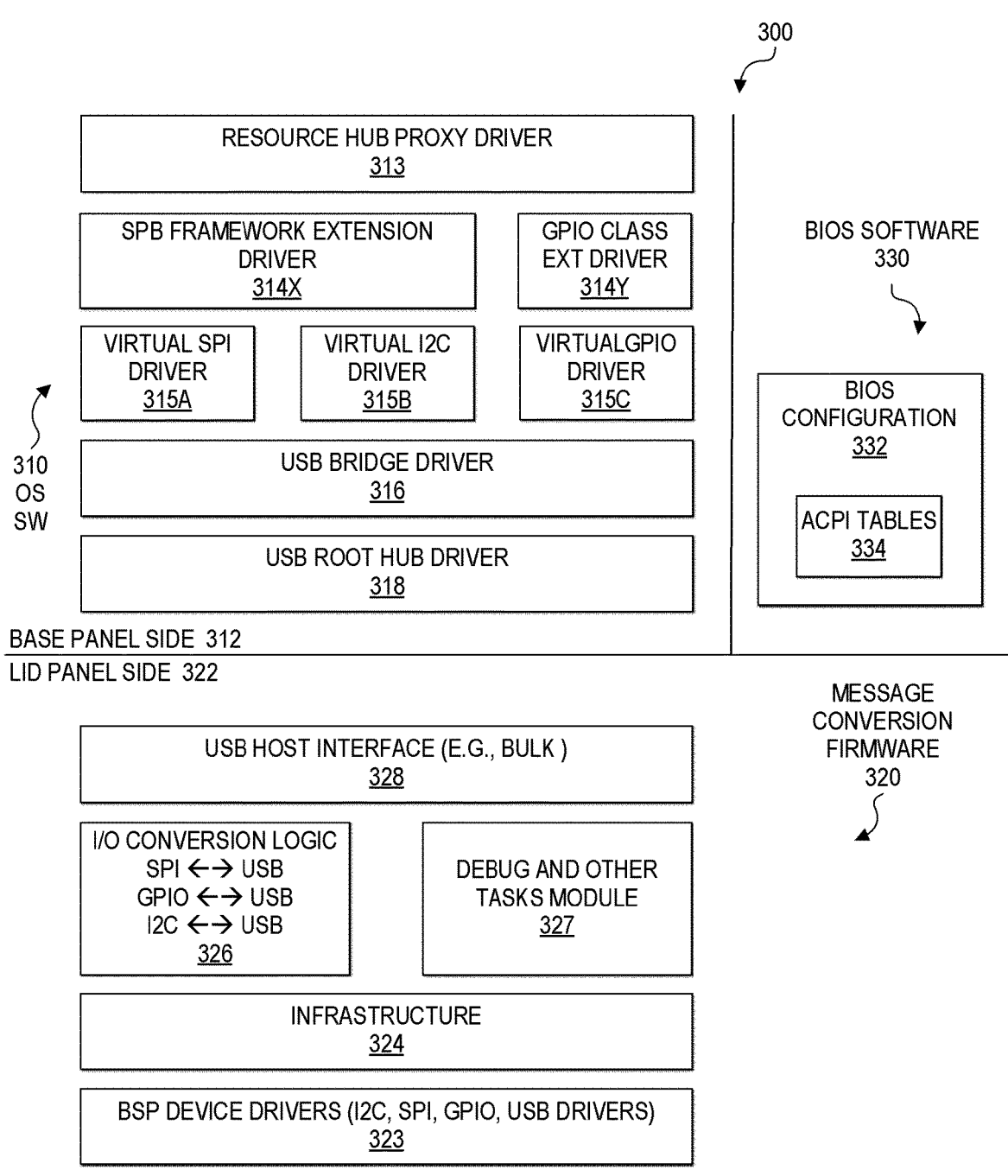
FIG. 3 is a block diagram illustrating an example software, firmware, and bios stack for a message conversion system in a computing device according to at least one embodiment.

FIG. 3 is a block diagram illustrating one possible implementation of a software and firmware stack 300 for a message conversion system according to at least one embodiment. As shown in FIG. 3, software and firmware stack 300 includes a base panel side 312 and a lid panel side 322. The lid panel side 322 includes message conversion firmware 320 and the base panel side 312 includes operating system software (OS SW) 310 and basic input/output system (BIOS) software 330. In one example, software and firmware stack 300 may be implemented in a computing device, such as computing device 200 illustrated in FIG. 2. For example, message conversion firmware 320 may be configured to run on a processor of message converter MCU 240, which is disposed in lid panel 220 of computing device 200. In this example, operating system software 310 and bios software 330 may be configured to run on CPU 212 in motherboard 214, which is disposed in base panel 210 of computing device 200. For ease of understanding, the following description of software and firmware stack 300 references, in at least some instances, the hardware components of FIG. 2.

For illustration purposes, operating system software 310 includes software components or modules to implement an embodiment of a message conversion system in a computing device that runs Microsoft® Windows® operating system (Microsoft Corp, Redmond, Washington). It should be understood, however, that one or more embodiments of a message conversion system, as disclosed herein, may be adapted for any operating system including, but not necessarily limited to, MacOS or Apple iOS (Apple Inc., Cupertino, California), Google Android (Google Inc., Mountain View, California), Linux, a real-time operating system (RTOS), or any customized and/or proprietary operating system.

The message conversion firmware 320 can include common components such as bulk synchronous parallel (BSP) device drivers 323, infrastructure 324, a USB host interface 328, and a debug and other tasks module 327. BSP device drivers 323 enables communication between the message converter MCU and remote I/O devices (e.g., remote I/O devices 222A-222C) that use various communication protocols including, but not necessarily limited to, SPI, I2C, GPIO, UART, USB, etc., or any suitable combination thereof depending on the particular remote I/O devices implemented in the computing device. The debug and other tasks module 327 provides runtime information for debugging.

USB host interface 328 manages communication between CPU 212 and the message converter MCU 240. In at least one implementation, CPU 212 may be designated as the USB host and the message converter MCU 240 may be designated as the USB device. Message converter MCU 240 may be a bulk endpoint and USB host interface 328 can facilitate bulk transfers to (and from) the CPU 212. Bulk transfers are typically used for large bursty data and provide error correction. Control transfers and interrupt transfers may also be facilitated by USB host interface 328 in communications with CPU 212. For example, control transfers may be used for command and status operations and interrupt transfers may be used to get immediate attention for an event.

In at least one embodiment, the message conversion firmware 320 includes I/O conversion logic 326 to convert SPI, I2C, and GPIO messages (and potentially others) into USB messages (e.g., USB packets), and vice versa for any USB messages received from CPU 212. In particular, I/O conversion logic 326 may be configured to convert an input SPI message received from remote I/O device 223A into an output USB message to send to CPU 212, and to convert an input USB message from CPU 212 into an output SPI message to send to remote I/O device 223A. I/O conversion logic 326 may also be configured to convert an input I2C message received from remote I/O device 223B into an output USB message to send to CPU 212, and to convert an input USB message received from CPU 212 into an output I2C message to send to remote I/O device 223B. I/O conversion logic 326 may be further configured to convert an input GPIO message (e.g., signal) received from remote I/O device 223C into an output USB message to send to CPU 212, and to convert an input USB message received from CPU 212 into an output GPIO message (e.g., signal) to send to remote I/O device 223C. The output USB messages may be passed through USB host interface 328 to USB root hub driver 318 on the base panel side 312 via high-speed bus 242 (e.g., USB bus).

The operating system software 310 on the base panel side 312 may include common drivers such as USB root hub driver 318 and a resource hub proxy driver 313. USB root hub driver 318 is a software driver that enables multiple USB peripherals to be connected to the CPU. Thus, depending on the particular implementation, one or more USB peripherals other than message converter MCU 240 may be connected to CPU 212 via USB root hub driver 318 (or another root hub driver).

Resource hub proxy driver 313 may interact with framework extension drivers, such as a serial peripheral bus (SPB) framework extension driver 314X (e.g., SpbCx.sys) and a GPIO class extension driver 314Y (e.g., GpioClx.sys), to provide upper layer software with access to input messages received from remote I/O devices. Resource hub proxy driver 313 can also provide output messages from upper layer software to the framework extension drivers 314X 314Y to be communicated to remote I/O devices 222A-222C in the lid panel 220.

In one or more embodiments, operating system software 310 also includes other drivers to convert USB messages received by operating system software 310 back to the original I/O messages, according to the appropriate communication protocol such as SPI, I2C, or GPIO, for example. These other drivers can also convert output messages (e.g., from an application layer) intended for remote I/O devices that use various protocols (e.g., SPI, I2C, and GPIO) into output messages based on the USB protocol or another high-speed protocol in alternative implementations. For example, the application layer can read from (e.g., polling, direct memory access (DMA), etc.), write to (e.g., regular write, DMA write, etc.), receive interrupts from (e.g., GPIO interrupt, DMA completion callback, etc.) the I/O devices. In one or more embodiments, these other drivers that perform message conversion in operating system software 310 on the base panel side 312 can include a USB bridge driver 316 and corresponding virtual I/O drivers for each communication protocol of a remote I/O device. The corresponding virtual I/O drivers in the example of FIG. 3 include a virtual SPI driver 315A, a virtual I2C driver 315B, and a virtual GPIO driver 315C.

The USB bridge driver 316 can receive a USB message from USB root hub driver 318, where the USB message was generated by message conversion firmware 320 converting a message from a remote I/O device that uses another protocol (e.g., SPI, I2C, or GPIO). USB bridge driver 316 can convert the USB message back to the original message based on the original protocol (e.g., SPI, I2C, or GPIO). The USB bridge driver 316 can also bridge requests from virtual I/O drivers 315A, 315B, and 315C and communicate with message converter MCU 240 via USB bus (e.g., high-speed bus 242) using USB bulk endpoint transfers. To facilitate communications from the host side (e.g., CPU 212) to the controller side (e.g., message converter MCU 240), USB bridge driver 316 collects the requests from virtual I/O drivers, encapsulates the requests, and bridges the encapsulated requests to message converter MCU 240 via a USB bus (e.g., high-speed bus 242). To facilitate communications from the controller side (e.g., message converter MCU 240) to the host side (e.g., CPU 212), USB bridge driver 316 continuously reads data packets from message converter MCU 240 via a USB bus (e.g., high-speed bus 242), converts the data packets of a message, and dispatches the converted data packets to the appropriate virtual I/O drivers. Converting the data packets of a message can include transforming, unmarshalling, and/or decapsulating the USB data packets to serialized data based on the original communication protocol of the message.

The USB bridge driver 316 can also be configured with other functionality. For example, USB bridge driver 316 may have an interrupt resource allocated in order to support interrupts in virtual GPIO driver 315C. Additionally, USB bridge driver 316 may be enabled with selective suspending. With this feature, USB bridge driver 316 can put the USB port for the message converter MCU 240 into a suspended mode to allow the system to save power. In this scenario, the USB bridge driver 316 may select a single USB port or multiple USB ports to suspend, and suspend the selected port(s) through the USB root hub driver 318.

Virtual I/O drivers 315A, 315B, and 315C of operating system software 310 work as controller drivers that communicate with USB bridge driver 316 and with framework extension drivers 314X and 314Y using, for example, device driver interface(s) (DDI). In the example of FIG. 3, virtual I/O drivers 315A, 315B, and 315C can receive SPI, I2C, and GPIO messages, which are generated by USB bridge driver 316 converting USB messages received from the message converter MCU 240. It should be appreciated that other virtual I/O drivers may be provided for other protocols (e.g., UART) supported in a message conversion system depending on particular implementations and needs. Virtual SPI driver 315A and virtual I2C driver 315B can be configured to support both polling and direct memory access (DMA), in which certain remote I/O devices are allowed to access system memory coupled to the CPU. Virtual GPIO driver 315C can be configured to support both direct read/write and interrupts. For upper layer SW, the virtual I/O drivers 315A-315C are exposed as "real" SPI/I2C/GPIO controller in the system.

For upper layer software running on the base panel side 312, the virtual I/O drivers 315A, 315B, and 315C are exposed as "real" or physical SPI, I2C, and GPIO controller drivers, respectively. The conversion of USB messages is hidden by USB bridge driver 316 on the base panel side 312 and I/O conversion logic 326 in firmware 320 on the lid panel side 322. Virtual SPI driver 315A, virtual I2C driver 315B, and virtual GPIO driver 315C can each expose respective pins from which upper layer software can read messages from the remote I/O devices and write messages to the remote I/O devices.

The basic/input output (BIOS) software 330 may be configured to support operating system software 310. In BIOS configuration 332, the supported virtual I/O drivers 315A-315C in operating system software 310 are each defined in an advanced configuration and power interface (ACPI) table(s) 334. Thus, the SPI, I2C, and GPIO virtual resources can be registered in the ACPI table(s) 334. Virtual I/O drivers 315A-315C can have dependency on the USB enumeration of the message converter MCU 240 in ACPI table(s) 334. This allows the virtual I/O drivers to run after the message converter MCU 240 is detected and USB bridge driver 316 is running. Also, each client device in the ACPI table using any of the virtual I/Os (e.g., electric shutter, camera, microphone, etc.) lists the resources to be used and lists the virtual I/O drivers as a dependency. For example, a client device may list virtual SPI driver 315A, virtual I2C driver 315B, and/or virtual GPIO driver 315C as a dependency based on which resources the client device uses. Accordingly, ACPI table(s) 334 can indicate to resource hub proxy driver 313 that a particular pin is not new, but instead, the pin is virtual and is linked to a particular virtual I/O driver.

It should be appreciated that various alternatives and/or modifications to the particular elements described above are intended to be within the scope of this application. For example, in addition to supporting SPI, I2C, and/or GPIO, one or more embodiments may be extended to support other protocols over USB such as UART. In this example, embodiments can be configured with suitable drivers and/or other components to support the other protocol(s). For example, to support UART over USB, a virtual UART driver may be included in operating system software 310 and BSP device drivers 323 of message conversion firmware 320 may include a UART driver to communicate with a remote I/O device using the UART protocol.

In addition, embodiments can be modified to convert messages based on low-speed protocols (e.g., SPI, I2C, GPIO, etc.), which originate from remote I/O devices in a lid panel of computing device, to messages based on peripheral component interconnect express (PCIe), which are then transferred across a hinge of the computing device to a CPU disposed in a base panel. Additionally, a dedicated MCU is optional. Alternatively, the MCU firmware logic can be merged into one of the USB devices in the lid panel. Although embodiments have been described as having remote I/O devices disposed in a lid panel of a computing device and a motherboard with a CPU disposed in a base panel of the computing device, it should be apparent that the broad concepts of embodiments disclosed herein apply to any computing device structure (e.g., any number of panels, any movement between the panels, any shape or configuration of panels) where a CPU or other processing element is separated from one or more remote I/O devices by a hinge or other coupling means or space over which it is beneficial to limit the number of wires.

It should also be noted that a dedicated MCU, such as message converter MCU 240, is one possible implementation of a message conversion system. In another example, the logic of message conversion firmware 320 could be merged into a USB device (or multiple USB devices) implemented in the lid panel.

Figure 4:
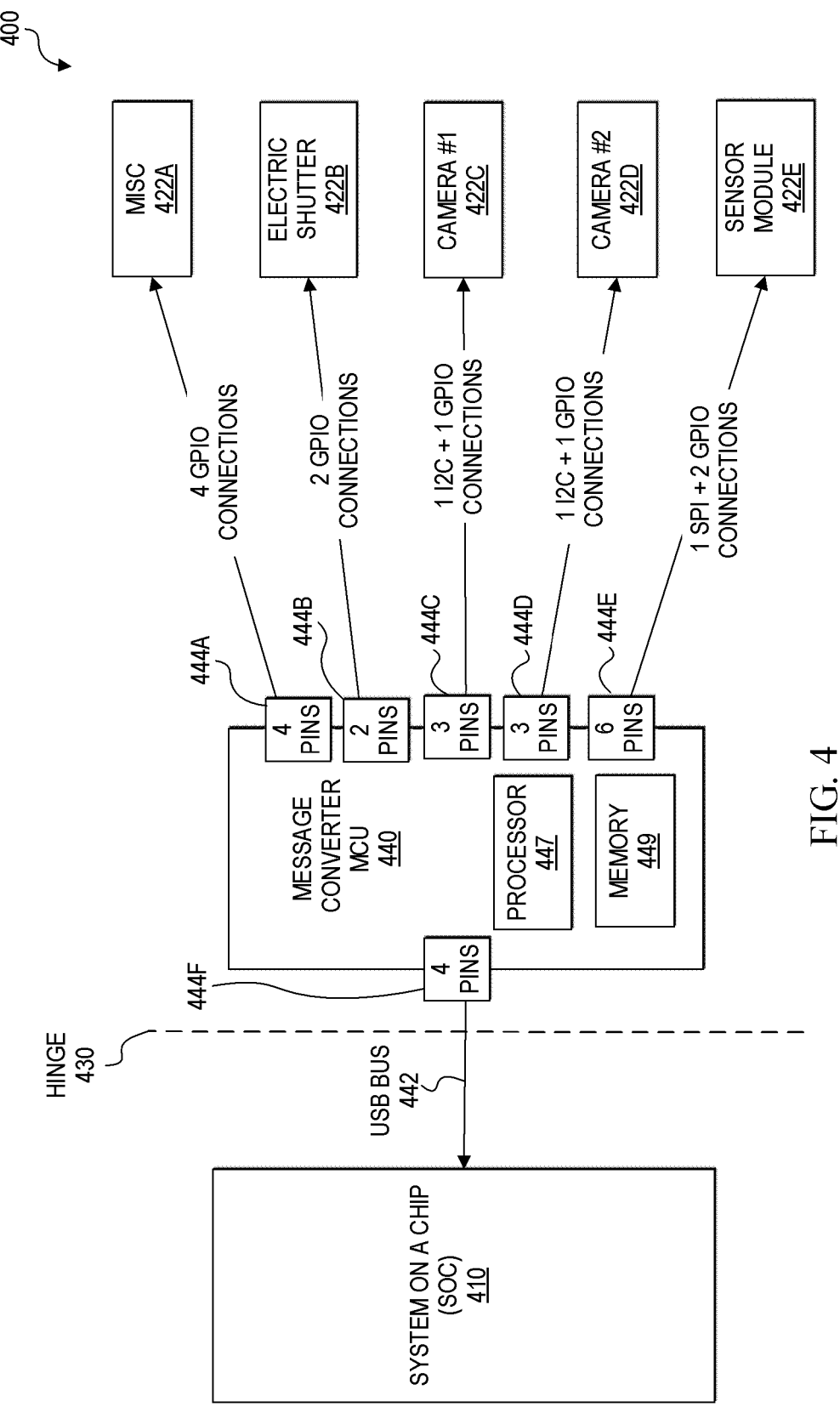
FIG. 4 is block diagram illustrating a hardware design of an example implementation of a message conversion system in a computing device according to at least one embodiment.

FIG. 4 is block diagram illustrating a hardware design 400 of an example implementation of a message conversion system according to at least one embodiment. The hardware design 400 illustrates remote I/O over USB including a system-on-a-chip (SOC) 410, a message converter MCU 440, and several remote hardware devices including a miscellaneous device 422A, an electric shutter 423B, a first camera 422C, a second camera 423D, and a sensor module 422E. Message converter MCU 440 may include a processor 447 and memory 449. In at least one example, message converter MCU 440 may be configured in the same or similar manner as message converter MCU 240, and the SOC 410 may be configured with an operating system software stack that is the same or similar to the operating system software 310 of CPU 212.

In this example, eighteen (18) total wires for communication from the I/O devices feed into the MCU 440. GPIO does not use a separate power or ground wire, SPI uses four communication pins and two other pins for power and ground, and I2C uses two communication pins along with two other pins for power and ground. For ease of illustration, the power and ground wires and corresponding pins are omitted from FIG. 4 and its description. Accordingly, in this example, message converter MCU 440 includes four pins 444A (i.e., 4 GPIO pins) for the miscellaneous device 422A, two pins 444B (i.e., 2 GPIO pins) for electric shutter 422B, three pins 444C (i.e., 2 I2C pins and 1 GPIO pin) for first camera 422C, three pins 444D (i.e., 2 I2C pins and 1 GPIO pin) for second camera 422D, and six pins 444E (i.e., 4 SPI pins and 2 GPIO pins) for sensor module 422E.

In hardware design 400, a single USB bus 442 extends across a hinge 430 to connect message converter MCU 440 to SOC 410. Message converter MCU 440 converts the messages from remote I/O devices 422A-422E to high-speed messages and transmits them over the USB connection via only four (4) pins 444F to SOC 410. Once the USB messages are received by SOC 410, SOC 410 converts the messages back to the original messages according to the appropriate communication protocol. As shown in FIG. 4, some remote I/O devices may use multiple communication protocols. For example, cameras 422C and 422D each use I2C and GPIO communication protocols, and sensor module 422E uses SPI and GPIO communication protocols. In at least one embodiment, each packet generated by message converter MCU 440 includes a type field to identify the particular type of communication protocol from which the message contained in the USB packet originated.

FIGS. 5A-5E illustrate one possible example USB-to-IO conversion protocol that may be used in one or more embodiments of a message conversion system. FIG. 5A illustrates a data packet layout 510 for a USB packet that is generated to encapsulate an I/O message received from a remote I/O device using one communication protocol (e.g., low-speed protocol such as SPI, I2C, or GPIO). Data packet layout 510 includes four one-byte fields and a variable-byte field for payload data. The one-byte fields contain metadata for the message including a command (e.g., a transaction type of the I/O message), a protocol type of the I/O message (e.g., SPI, I2C, GPIO, etc.), the length of the payload data, and a flag. The payload data may have a maximum size calculated as the maximum packet size minus the four metadata bytes.

FIG. 5B is a table 520 providing a data packet field description. A command ("cmd") field 522 can have different values depending on the protocol type of the I/O message and the purpose or transaction type of the message (e.g., initialize, read, write, configure, interrupt, etc.). Example command field values are shown and described in further detail with reference to FIGS. 5C-5E. A type field 524 may be one byte and have a value represented by T1, T2, or T3 that indicates the protocol type of the I/O message (e.g., GPIO, I2C, or SPI) encapsulated in the packet.

A length field 525 is one byte and indicates the length of the payload data. A payload field 528 includes the payload data and can range from zero bytes to the maximum number of bytes of the packet less the four bytes for the metadata (e.g., cmd, type, len, and flags). For a 64-byte packet, for example, the payload data may range from zero to fifty-nine bytes, and the length field 525 may include a corresponding value of 0-59.

A flags field 526 is one byte and may include an acknowledgement flag (ACK_FLAG), a response flag (RESP_FLAG), a completed flag (CMPL_FLAG), and an error flag (ERR_FLAG). In one example, each flag may be set (binary 1) or not set (binary 0) in a designated bit position. For example, acknowledgement flag may correspond to bit 0, response flag may correspond to bit 1, completed flag may correspond to bit 2, and error flag may correspond to bit 3. When the acknowledgement bit 0 is not set, the message conveys that no response is needed, but when the acknowledgement bit is set, the message conveys that a response is needed. When the response flag bit 1 is not set, the message conveys that it is a request, and when the response flag bit 1 is set, the message conveys that it is a response. When the completed flag bit 2 is not set, then message conveys that the packet is partial, but when the completed flag bit 2 is set, the message conveys that the packet is completed. When the error flag bit 3 is not set, the message conveys that there is no error, but when the error flag bit 3 is set, the message conveys that there is an error.

FIGS. 5C-5E are tables illustrating the various command and payload definitions for protocol types of I/O messages encapsulated in USB packets. FIG. 5C is a GPIO command table 530 including example GPIO commands, corresponding value representations, and descriptions of the GPIO commands. When the type field 524 of a data packet indicates the data packet contains a GPIO message, a corresponding value can be included in command field 522 to indicate the transaction type of the GPIO message. For example, a GPIO configuration command (GPIO_CONFIG) may correspond to a value represented by X1. The value represented by X1 may be used in the data packet to indicate that the GPIO message is to configure the GPIO controller. A GPIO write command (GPIO_WRITE) may correspond to a value represented by X2. The value represented by X2 may be used to indicate that the remote I/O device wants to write data. A GPIO read command (GPIO_READ) may correspond to a value represented by X3. The value represented by X3 may be used in the data packet to indicate that the remote I/O device wants to read data. GPIO interrupt commands (GPIO_INT_EVENT, GPIO_INT_MASK, GPIO_INT_UNMASK) may correspond to values represented respectively by X4, X5, and X6. The values represented by X4, X5, and X6 may be used to notify the processor or remote I/O device about an interrupt event, to mask GPIO pin interrupts, and to unmask GPIO pin interrupts.

5D is an I2C command table 540 including I2C commands, example corresponding values, and descriptions of the I2C commands. When the type field 524 of a data packet indicates the data packet contains an I2C message, a corresponding value can be included in command field 522 to indicate the transaction type of the I2C message. For example, an I2C initialize command (I2C_INIT) may correspond to a value represented by Y1. The value represented by Y1 may be used in the data packet to indicate that the I2C message is to initialize and configure the I2C controller. An I2C transfer command (I2C_XFER) may correspond to a value represented by Y2. The value represented by Y2 may be used in the data packet to indicate that the transfer of the I2C packet is happening or will happen. An I2C write command (GPIO_WRITE) may correspond to a value represented by Y3. The value represented by Y3 may be used in the data packet to indicate that the requester wants to write data to the I2C bus. An I2C read command (I2C_READ) may correspond to a value represented by Y4. The value represented by Y4 may be used in the data packet to indicate that the requester wants to read data from the I2C bus. An I2C stop command (I2C_STOP) may correspond to a value represented by Y5. The value represented by Y5 may be used in the data packet to indicate that the I2C transfer of the data has stopped. An I2C start command (I2C_START) may correspond to a value represented by Y6. The value represented by Y6 may be used in the data packet to indicate that the I2C transfer of data is starting.

FIG. 5E is an SPI command table 550 including SPI commands, example corresponding values, and descriptions of the SPI commands. When the type field 524 of a data packet indicates the data packet contains an SPI message, a corresponding value can be included in command field 522 to indicate the transaction type of the SPI message. For example, an SPI initialize command (SPI_INIT) may correspond to a value represented by Z1. The value represented by Z1 may be used in the data packet to indicate that the SPI message is to initialize and configure the SPI controller. An SPI de-initialize command (SPI_DEINIT) may correspond to a value represented by Z2. The value represented by Z2 may be used in the data packet to indicate that the SPI message is to finalize initialization of the SPI controller. An SPI read command (SPI_READ) may correspond to a value represented by Z3. The value represented by Z3 may be used in the data packet to indicate that the requester wants to read data from the SPI bus. An SPI write command (SPI_WRITE) may correspond to a value represented by Z4. The value represented by Z4 may be used in the data packet to indicate that the requester wants to write data to the SPI bus. An SPI write-read command (SPI_WRITEREAD) may correspond to a value represented by Z5. The value represented by Z5 may be used in the data packet to indicate that the requester wants to write data to and read data from the SPI bus.

Turning to FIG. 6, FIG. 6 is a flowchart illustrating an example process 600 associated with one or more embodiments of a message conversion system in a computing device in which a message originates at a remote I/O device and is sent to a processor. In one example, the remote I/O device may be disposed in a lid panel of a computing device, the processor may be disposed in a base panel of the computing device, and the lid panel and base panel may be movably coupled relative to each other via a hinge or other suitable mechanism. In at least one embodiment, one or more operations correspond to activities of FIG. 6. A message converter MCU (e.g., 240, 440) including a firmware stack (e.g., 320), or a portion thereof, may perform or utilize may perform or utilize at least some operations of the one or more operations. A processor (e.g., 212, 420) including a software stack (e.g., 300), or a portion thereof, may perform or utilize at least some other operations of the one or more operations. In at least one example, I/O conversion logic 326 of message conversion firmware 320, and a USB bridge driver 316 and virtual I/O drivers 315A-315C of operating system software 310 may perform one or more operations. Additionally, ACPI tables 334 may also be configured to enable one or more operations by USB bridge driver 316 and/or virtual I/O drivers 315A-315C.

At 602, a message converter MCU receives an input I/O message from a remote I/O device. In one example, the message converter MCU may be disposed in the same panel of a computing device as the remote I/O device. The input I/O message could be, for example, an SPI message from a remote I/O device using an SPI communication protocol, an I2C message from a remote I/O device using an I2C communication protocol, a GPIO message from a remote I/O device using a GPIO communication protocol, a UART message from a remote I/O device using UART communication protocol, or any other I/O communication protocol.

At 604, the message converter MCU converts the input I/O message into a host message packet that identifies the type of the originating I/O communication protocol of the input I/O message. The host message could be based on any suitable host communication protocol including, but not necessarily limited to, USB, PCIe, or other high-speed communication protocol. The host message may include a command value that represents a transaction type of the input I/O message. Transaction types may depend on the particular communication protocol of the input I/O message and could include, for example, read, write, start, stop, initialize/configure, transfer, notify/mask/unmask interrupt, and any other suitable transaction type for the relevant communication protocol.

At 606, the message converter MCU sends the host message to a processor (e.g., host CPU) via a high-speed bus. In an embodiment, the processor may be disposed in the base panel of the computing device and may be connected to the message converter MCU by a bus that traverses a hinge connecting the base panel to another panel (e.g., lid panel) containing the MCU.

At 608, the operating system running on the processor receives the host message as input. At 610, the operating system determines the type of the originating I/O communication protocol of the I/O message encapsulated in the host message.

At 612, the input host message is converted to the original I/O message. For example, the original I/O message could be an SPI message, an I2C message, a GPIO message, a UART message, etc. At 614, the original I/O message is provided to the appropriate virtual I/O driver based on the type of the originating communication protocol, as determined at 610 in this example.

At 616, the virtual I/O driver that receives the original I/O message exposes virtual pins to enable an upper software layer to read the original I/O message.

FIG. 7 is a flowchart illustrating an example process 700 associated with one or more embodiments of a message conversion system in a computing device, in which a message originates at a processor and is sent to a remote I/O device. In one example, the remote I/O device may be disposed in a lid panel of a computing device, the processor may be disposed in a base panel of the computing device, and the lid panel and base panel may be movably coupled relative to each other via a hinge or other suitable mechanism. In at least one embodiment, one or more operations correspond to activities of FIG. 7. A processor (e.g., 212, 420) including a software stack (e.g., 300), or a portion thereof, may perform or utilize at least some operations of the one or more operations. A message converter MCU (e.g., 240, 440) including a firmware stack (e.g., 320), or a portion thereof, may perform or utilize at least some other operations of the one or more operations. In at least one example, I/O conversion logic 326 of message conversion firmware 320, and a USB bridge driver 316 and virtual I/O drivers 315A-315C of operating system software 310 may perform one or more operations. Additionally, ACPI tables 334 may also be configured to enable one or more operations by USB bridge driver 316 and/or virtual I/O drivers 315A-315C.

At 702, virtual pins of a virtual I/O driver of an operating system running on a processor receives an I/O message from an upper software layer to be communicated to a remote I/O device. For example, the original I/O message could be an SPI message, an I2C message, a GPIO message, a UART message, etc.

At 704, the I/O message may be provided to an operating system bridge driver to convert the message. At 706, the I/O message is converted into a host message that identifies the type of the communication protocol of the I/O message. The host message could be based on any suitable host communication protocol including, but not necessarily limited to, USB, PCIe, or other high-speed communication protocol. The host message may include a command value that represents a transaction type of the I/O message.

At 708, the processor sends the host message to the message converter MCU via a high-speed bus (e.g., USB bus, PCIe bus).

At 710, the message converter MCU receives the host message. At 712, the MCU operating system determines the type of the originating I/O communication protocol of the I/O message encapsulated in the host message.

At 714, the message converter MCU converts the host message into the original I/O message based on the determined type of I/O communication protocol associated with the I/O message contained in the host message.

At 716, the message converter MCU sends the original I/O message to the appropriate remote I/O device.

Turning to another embodiment, a message passthrough system for messages from a human interface device (e.g., a touch screen) in a lid panel using various communication protocols, enables messages from a human interface device (HID) using certain low-speed communication protocols to use a high-speed communication protocol (e.g., universal serial bus (USB) or "HID over USB") to passthrough to a CPU in another panel of the computing device. One or more embodiments generates packets based on the that are sent to a processor in the base panel of the computing device. The remote HID device in the lid panel may use a certain communication protocol such as, for example, HID over inter-integrated circuit (I2C) (also referred to herein as "HID over I2C") or HID over serial peripheral interface (SPI) (also referred to herein as "HID over SPI"). In reverse, the processor may send packets based on the HID over USB protocol to the remote human interface device in the lid panel, and the packets are converted to messages based on the appropriate HID protocol (e.g., HID over I2C, HID over SPI). In at least one embodiment, a message passthrough microcontroller unit (MCU) may be added in the lid panel and configured to communicate to the remote human interface device via the appropriate HID protocol (e.g., HID over I2C, HID over SPI) and to the processor via another HID protocol (e.g., HID over USB), and to perform the appropriate conversion based on which protocol is used by the human interface device to communicate with the processor in the base panel.

With the example message passthrough system for human interface device communications, the number of wires extending from one panel of a computing device to another panel of the computing device can be reduced and the amount of reduction may depend on the particular communication protocol used by the human interface device. For example, a touch controller using HID over I2C can use six pins to communicate with a processor, while using HID over SPI can use up to ten pins to communicate with the processor. Thus, depending on the particular protocol used in the computing device, the number of pins may be reduced by two to six (e.g., from 10 SPI/G PIO wires to 4 USB wires, or from 6 I2C/GPIO wires to 4 USB wires). Such a decrease in wires across the hinge of laptops provides significant industrial design value and bill of materials cost reduction to produce the computing device. Moreover, advanced touch features can be added, such as touch smoothing among others, to enhance the user experience.

Figure 8:
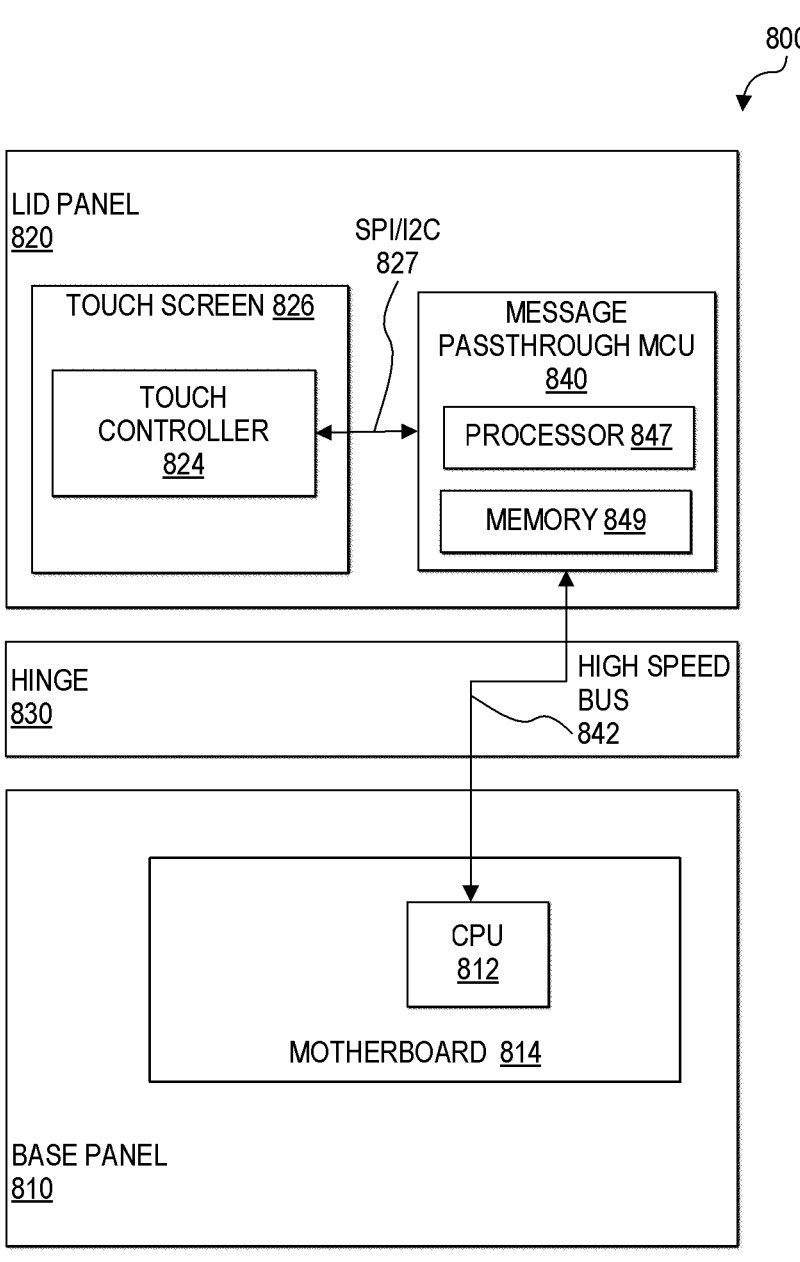
FIG. 8 is a block diagram illustrating a second example computing device comprising a human interface device (HID) message passthrough system according to at least one embodiment.

FIG. 8 is a block diagram illustrating an example computing device 800 comprising a human interface device (HID) message passthrough system to reduce the number of pins across a hinge 830 without increasing latency or power consumption according to at least one embodiment. Computing device 800 includes a base panel 810 and a lid panel 820 connected by a hinge 830. Base panel 810 can include a central processing unit (CPU) 812 connected to, or integrated with, other computer components on a motherboard 814 (e.g., an electronic circuit board integrating and/or connecting components of a computer) in base panel 810.

Lid panel 820 can also include one or more HID devices, such as a touch screen 826 coupled to a touch controller 824. Touch controller 824 is an integrated circuit that converts an input signal into a measurable signal using algorithms (e.g., hardware, software, and/or firmware) to determine the touch position on the touch screen 826. The input signal may be generated in response to a finger or suitable object such as a stylus contacting the surface of touch screen 826. Touch controller 824 may communicate data, including touch position information, with CPU 812 through a message passthrough microcontroller unit (MCU) 840 using various communication protocols for a human interface device (HID). Although touch screen 826 is provided as an example in FIG. 8, it should be understood that any other suitable HID devices (e.g., manual panel controls, simulation devices, remote controls may be disposed in lid panel 820.

Touch screen 826 uses a human interface device (HID) as its transfer protocol (e.g., HID over I2C, HID over SPI). At least one high-speed bus (e.g., USB) also natively supports a HID protocol. Accordingly, embodiments herein can passthrough low-speed HID signals (also referred to herein as 'messages') that are based on a HID over I2C protocol or a HID over SPI protocol, and transmit the messages to CPU 812 by bridging the HID over I2C or HID over SPI messages to high-speed HID over USB messages. The HID over USB messages can be transmitted to CPU 812 over a USB bus (e.g., a high-speed bus 842) that traverses hinge 830 to CPU. Because the HID over USB protocol is natively supported by an operating system in CPU 812, the HID over USB message does not need to be converted back to the original protocol, but instead, can be interpreted and processed based on the HID over USB protocol.

In at least one embodiment, any suitable hardware, firmware, and/or software may be provided in lid panel 820 to function as a bridge that connects a HID device, such as a touch screen 826 in lid panel 820, over another communication protocol using fewer wires to CPU 812 in base panel 810. The hardware, firmware, and/or software may be embodied as any suitable integrated circuit that can perform the HID message passthrough operations disclosed herein and that is sized for placement in a lid panel of the computing device. In one example, a message passthrough MCU 840 may be embedded in the lid panel 820 of computing device 800 to perform the HID message passthrough operations. It should be noted, however, that firmware included in message passthrough MCU 840, which will be further described herein, may be adapted for any microcontroller unit or other component that provides HID over USB functionality. In other embodiments, other components that implement suitable HID communication protocols (e.g., HID over USB, HID over PCIe, etc.) to communicate with the CPU in the base panel may be leveraged with appropriate firmware and/or software to bridge messages from HID devices in the lid panel through those other components to the CPU in the base panel.

Message passthrough MCU 840 can include a processor 847 and memory 849. Generally, processor 847 may be any suitable single or multi-core processor comprising circuitry to process instructions that drive the MCU 840. Processor 847 may access data and code (e.g., firmware and/or software) from memory 849. In at least one example architecture of MCU 840, memory 849 may be an internal physical memory such as, for example, random access memory (RAM), dynamic random access memory (DRAM), synchronous dynamic random access memory (SDRAM), static random access memory (SRAM), read-only memory (ROM), programmable ROM (PROM), erasable PROM (EPROM), electrically EPROM (EEPROM), or other types of machine-readable storage media that are capable of storing data and information. In some examples, message passthrough MCU 840 may include any other suitable elements such as a clock (e.g., oscillator), and I/O interfaces, where each I/O interface is a connecting point between the message passthrough MCU 840 and another entity, such as touch controller 824 or CPU 812, based on a particular communication protocol.

In one or more embodiments, message passthrough MCU 840 can be communicatively coupled to touch screen 826 through an interface based on a communication protocol such as HID over SPI or HID over I2C. The interface can include one or more pins on the MCU depending on the particular requirements of the communication protocol for the interface. In some implementations, message passthrough MCU 840 can be communicatively coupled to multiple HID devices through multiple interfaces based on multiple protocols (e.g., HID over SPI, HID over I2C, etc.). Message passthrough MCU 840 is configured to send messages to and/or receive messages from touch screen 826 over an SPI or I2C bus 827, depending on which communication protocol is implemented by touch controller 824. An appropriate number of pins may be provided in message passthrough MCU 840 to facilitate communication to and from touch screen 826 based on the communication protocol used by touch controller 824 to communicate with CPU 812. For example, an SPI bus may contain six to ten wires and six to ten corresponding pins may be provided in MCU 840, where two wires carry power and ground signals, and four to six wires carry communication signals according to the SPI protocol. Alternatively, an I2C bus may contain four wires and four corresponding pins may be provided in MCU 840, where two wires carry power and ground signals, and two other wires carry communication signals according to the I2C protocol.

Message passthrough MCU 840 can also be connected to CPU 812 using the HID over USB communication protocol. Message passthrough MCU 840 is configured to send messages to and/or receive messages from CPU 812 using USB bus, such as high-speed bus 842. HID over USB communication protocol enables a processor (e.g., 812) to communicate with a HID device, such as touch screen 826.

Message passthrough MCU 840 may be configured to convert input HID messages of one protocol to output HID messages of another protocol. MCU 840 may be operably coupled to touch controller 824 to bridge SPI or I2C messages to HID over USB messages for transmission to CPU 812. If touch controller detects an event, such as a touch or stylus input, and generates a HID over I2C or HID over SPI message to transfer to CPU 812, the HID over I2C or HID over SPI message can be sent to message passthrough MCU 840. Firmware in MCU 840 converts the input HID message to a HID over USB message. The message passthrough MCU 840 can send the HID over USB message to CPU 812 via a USB bus (e.g., high-speed bus 842). If an operating system has a message (e.g., command, read/write request, etc.) to communicate to touch screen 826, then a HID over USB message is sent to MCU 840 via the USB bus, and the firmware in MCU 840 converts the HID over USB message to a HID over I2C message or a HID over SPI message, depending on which protocol is used by touch screen 826. The generated HID over SPI or HID over I2C message can be sent to touch screen 826 via an SPI or I2C interface to the SPI or I2C bus 827, depending on which communication protocol is used by touch screen 826.

Regarding the HID over USB communication protocol, in one example, CPU 812 may be configured as the USB host, message passthrough MCU 840 may be configured as the USB device, and high-speed bus 842 may be configured as the USB bus that connects CPU 812 to message passthrough MCU 840 to enable communication therebetween. As previously described herein, one version of a USB bus can include two wires for power (e.g., VCC and ground) and a pair of wires to carry the data. Generally, any number wires to carry data that is supported by the USB specification and is less than the number of wires needed for the touch screen using another protocol (e.g., HID over I2C, HID over SPI, etc.) may be used. In one example implementation of a message passthrough system, message passthrough MCU 840 may be provided with four pins to communicate with CPU 812 according to the USB protocol and the USB version (e.g., USB 2.0) using four wires (e.g., 2 for power and ground and 2 for data).

In the HID over USB protocol, a transfer may include one or more transactions that create a set of data that meaningful to the USB device (e.g., message passthrough MCU 840). For example, input reports, output reports, and feature reports may be different types of transfers in the HID over USB communication protocol. An input report (or input data) may be a uni-directional report that is sent from the USB device (e.g., message passthrough MCU 840) to the USB host (e.g., CPU 812). An output report (or output data) may be a uni-directional report that is sent from the USB host to the USB device. A feature report may be a bi-directional report that can be sent from the USB host to the USB device or from the USB device to the USB host. The USB host can use a Set_Report request to allow the USB host to send a report to the USB device.

Pipes in HID over USB are different ways of transmitting data between a USB host (driver) and a USB device. A control pipe is used for message-type data. An Interrupt In pipe is used for stream-type data. An optional Interrupt Out pipe may be used for sending low latency data from the USB host to the USB device.

In the HID over USB protocol, the USB host (e.g., CPU 812) can receive data from the USB device (e.g., MCU 840), by sending a Get_Report request to allow the USB host to receive data (e.g., input report) from the USB device. In one or more embodiments, the USB device can send data to the USB host that is obtained from a HID device. For example, the USB device determines whether an interrupt signal is asserted by the HID device (e.g., touch controller 824 of touch screen 826) according to the appropriate communication protocol (e.g., HID over I2C or HID over SPI), and if so, requests the data from the HID device. The messages containing data, such as an input report, that are received from the HID device are converted into one or more USB packets. The one or more USB packets containing data received from the HID device are sent to the USB host via an Interrupt In pipe, for example.

In the HID over USB protocol, the USB host (e.g., CPU 812) may also send data to the USB device (e.g., message passthrough MCU 840) by the USB host sending a Set_Report request to the USB device to allow the USB host to send data (e.g., output report) to the USB device. In one or more embodiments, the USB device can send data to the HID device it receives in a report from the USB host. For example, the USB device can write the data (e.g., output report) to the HID device using the appropriate communication protocol for the HID device (e.g., HID over I2C or HID over SPI).

It should be noted that other communication protocols may be used to connect a HID device to a CPU and may be incorporated into one or more embodiments. For example, other protocols that are adapted for use with HID devices may be used. Such protocols may send data that can passthrough over USB (or another similar high-speed and low wire count communication protocol such as PCIe) to the CPU. Conversely, data from the CPU can be sent to the message passthrough MCU and can passthrough to the HID device.

Figure 9:
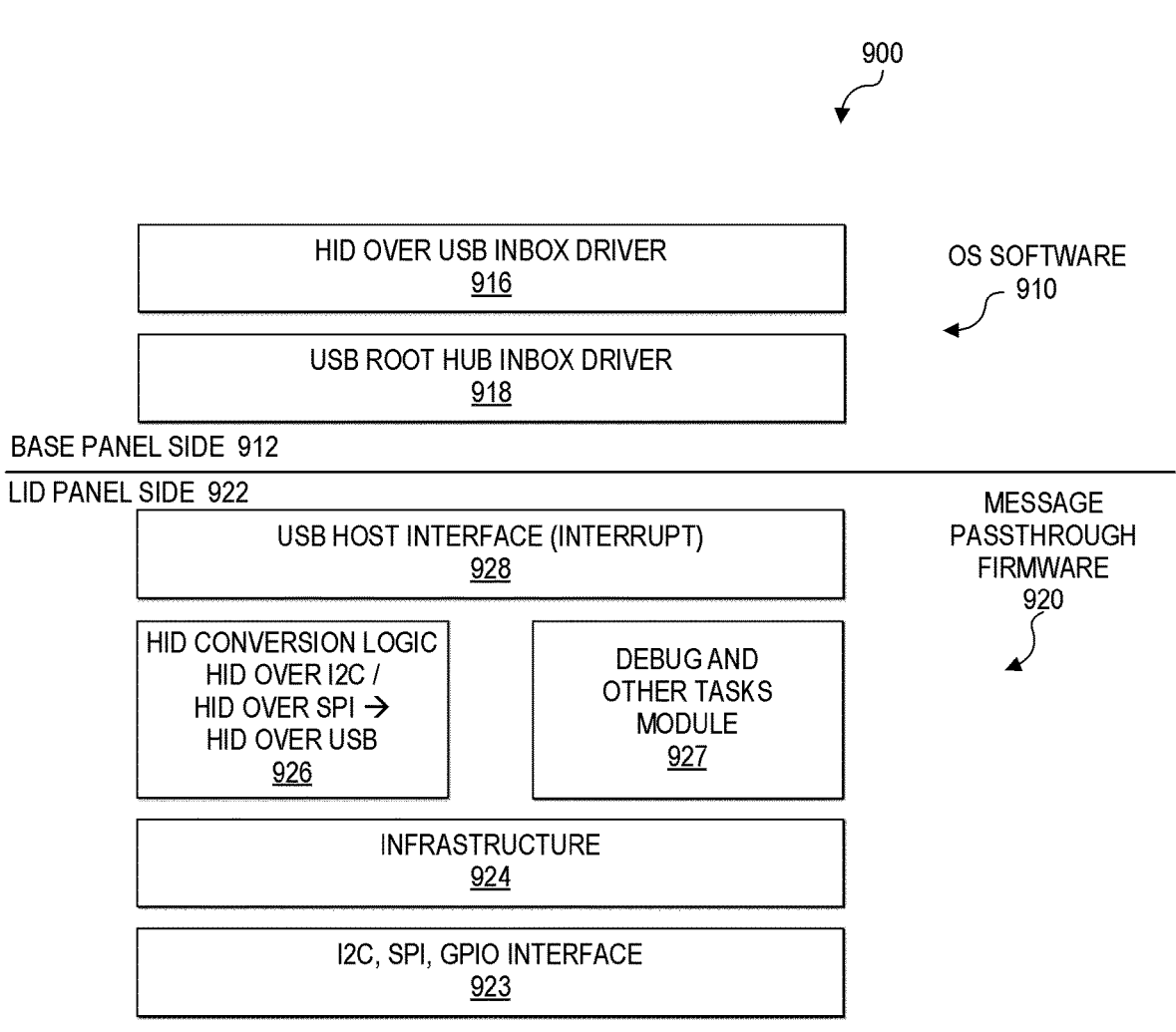
FIG. 9 is a block diagram illustrating an example software, firmware, and bios configuration for a HID message passthrough system according to at least one embodiment.

FIG. 9 is a block diagram illustrating an example software and firmware stack 900 for a HID message passthrough system according to at least one embodiment. As shown in FIG. 9, software and firmware stack 900 includes a base panel side 912 and a lid panel side 922. The lid panel side 922 includes message passthrough firmware 920 and the base panel side 912 includes operating system software (OS SW) 910. In one example, software and firmware stack 900 may be implemented in a computing device, such as computing device 800 illustrated in FIG. 8. For example, message passthrough firmware 920 may be configured to run on a processor of message passthrough MCU 840, which is disposed in lid panel 820 of computing device 800. In this example, operating system software 910 may be configured to run on CPU 812 in motherboard 814, which is disposed in base panel 810 of computing device 800. For ease of understanding, the following description of software and firmware stack 300 references, in at least some instances, the hardware components of FIG. 8.

For illustration purposes, operating system software 910 includes software components or modules to implement an embodiment of a HID message passthrough system in a computing device that runs Microsoft® Windows® operating system (Microsoft Corp, Redmond, Washington). It should be understood, however, that one or more embodiments of a message passthrough system, as disclosed herein, may be adapted for any operating system including, but not necessarily limited to, MacOS or Apple iOS (Apple Inc., Cupertino, California), Google Android (Google Inc., Mountain View, California), Linux, a real-time operating system (RTOS), or any customized and/or proprietary operating system.

The message passthrough firmware 920 can include common components such as a HID device interface 923, infrastructure 924, a USB host interface 928 (for interrupts), and a debug and other tasks module 925. HID device interface 923 is a firmware low level interface and provides device drivers based on the appropriate HID communication protocol used by the HID device (e.g., touch controller 824 of touch screen 826) to enable communication between the message passthrough MCU 840 and the HID device. The debug and other tasks module 927 provides runtime information for debugging.

USB host interface 928 is low level infrastructure and provides a USB access function to transfer USB messages to CPU 812 and to receive USB messages from CPU 812. USB host interface 928 manages communication between CPU 812 and the message passthrough MCU 840. In at least one implementation, CPU 812 may be designated as the USB host and the message passthrough MCU 840 may be designated as the USB device. Message passthrough MCU 840 may be an interrupt endpoint and USB host interface 928 can facilitate interrupt transfers to (and from) the CPU 812. The interrupt transfers may be used to send asynchronous data, which is received from the HID device, from the MCU 840 to CPU 812 and to receive low latency data from CPU 812, which is sent to the HID device. Interrupts, however, may be asserted by the HID device (e.g., touch controller 824 of touch screen 826) to message passthrough MCU 840. Control transfers may also be facilitated by USB host interface 928 in communications with CPU 812. For example, control transfers may be used for message-type data.

In at least one embodiment, message passthrough firmware 920 also includes HID conversion logic 926, which is configured to bridge a HID over I2C protocol or a HID over SPI protocol to a HID over USB protocol. This is also referred to herein as 'passthrough mode.' Because message passthrough firmware 920 implements HID over I2C and HID over SPI, it is compatible with HIDI2C and HIDSPI touch panels without any hardware or firmware customization.

The operating system software 910 on the base panel side 912 may include common drivers such as a USB root hub inbox driver 918 and a HID over USB inbox driver 916. USB root hub inbox driver 918 enables human interface device peripherals, such as touch screen 826, to be connected to the CPU. The HID over USB inbox driver 916 supports a HID over USB device (e.g., message passthrough MCU 840). The HID over USB inbox driver 916 can identify the MCU 840 as a HID class device.

Figure 10:
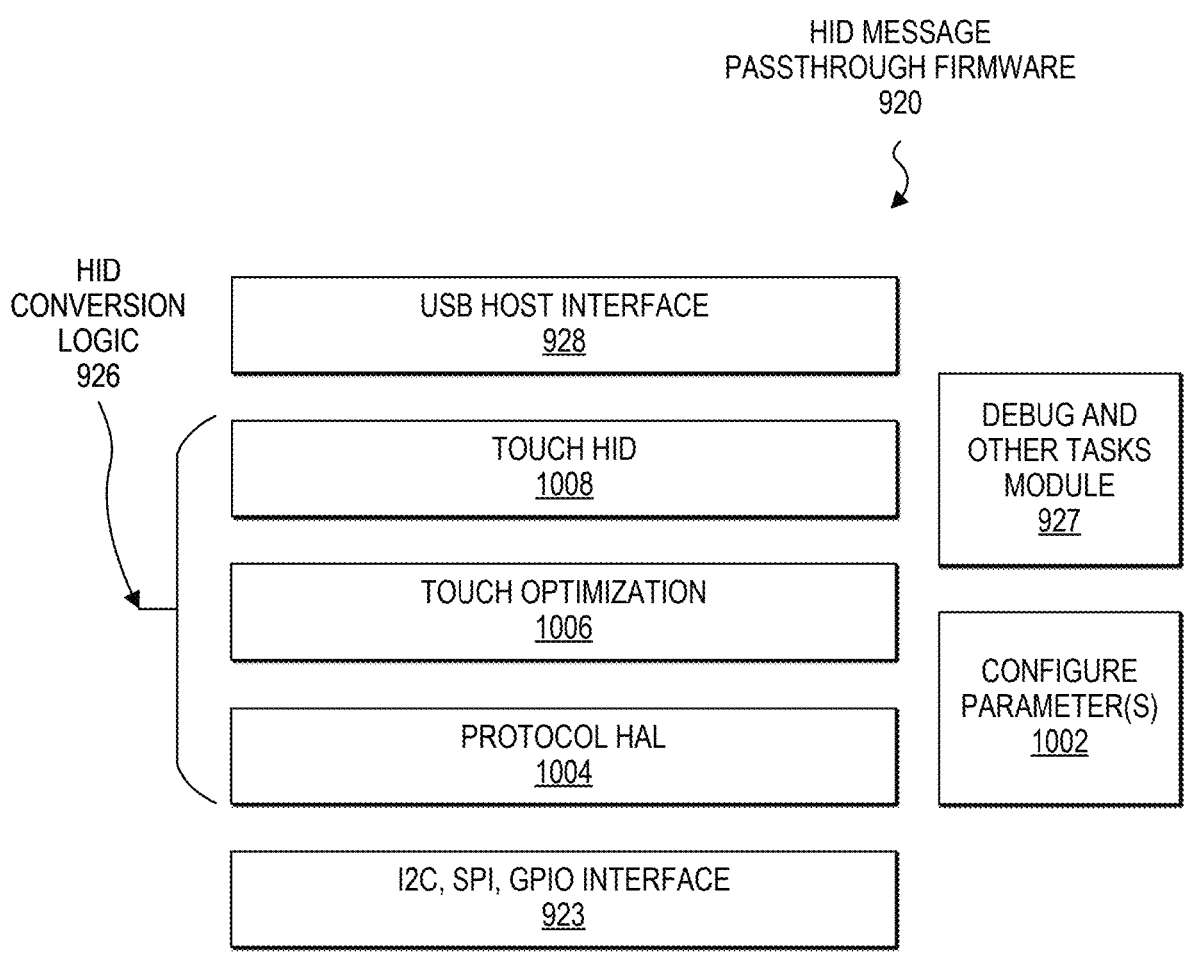
FIG. 10 is a block diagram illustrating example firmware for a HID message passthrough system according to at least one embodiment.

FIG. 10 is a block diagram illustrating additional example details in message passthrough firmware 920 for a HID message passthrough system according to at least one embodiment. Message passthrough firmware 920 illustrates additional details of HID conversion logic 926, in addition to a configure parameter 1002 that may be used in one or more embodiments. As shown in FIG. 10, in one or more embodiments, HID conversion logic 926 can include a hardware abstraction layer (HAL) 1004, a touch optimization layer 1006, and a touch HID layer 1008.

The protocol hardware abstraction layer 1004 implements the appropriate communication protocol interfaces to communicate with touch screen 826, depending on which communication protocols are implemented by the touch controller 824 of the touch screen. For example, touch controller 824 may implement HID over I2C controller drivers or HID over SPI for capturing touch events, along with the GPIO protocol to enable interrupts and resets. Interrupts may be asserted by the touch controller 824 to notify the message passthrough MCU 840 that touch event data has been captured and is waiting to be transferred. In this example, the protocol HAL 1004 may include a HID over I2C or HID over SPI interface to receive data from and send data to the touch screen based on the appropriate communication protocol. The protocol HAL 1004 can also include a GPIO interface to receive interrupt signals from the touch screen and to reset the HID device for example, when the system resumes after being in a sleep mode.

One or more configure parameters 1002 may be used by touch controller 824 of touch screen 826 and, in one or more embodiments, may be provided in message passthrough firmware 920. Configuration parameter(s) 1002 can record the configurations and status of the touch function, which can include, but are not necessarily limited to, GPIO pins (e.g., one for interrupts and one for resets), protocol(s) implemented by the touch screen (e.g., HID over I2C, HID over SPI, GPIO), bus type, etc. By including configuration parameter(s) 1002 in the message passthrough firmware 920, adding the configuration parameter(s) to the BIOS ACPI table is rendered unnecessary. Accordingly, in at least one embodiment, no changes are needed to the operating system or BIOS to implement the HID message passthrough system.

Optionally, one or more embodiments can include touch optimization layer 1006 as an add-on module to optimize and/or improve the user experience with the touch screen 826. Touch optimization layer 1006 can include one or more algorithms to perform touch data smoothing and/or touch events coalescing as needed. For example, once a HID over I2C or HID over SPI input report is received by message passthrough MCU 840, the touch optimization layer 1006 can use additional information such as touch size, touch counter, and scan time as inputs to the one or more touch optimization algorithms to modify the data to effect smoothing and/or coalescing. Touch size and touch counter can be read from the touch controller 824 via the SPI or I2C interface. Scan time may be obtained from a display timing controller (TCON), which is the vertical synchronization of the display refresh.

In alternative embodiments, touch optimization may be added as a software layer at the application level on top of operating system software 910. Depending on the particular platform, however, certain additional information such as touch size, touch counter, and scan time may not be available as inputs for touch optimization. Additionally, latency may increase when touch optimization is performed in an operating system application. Thus, the user experience may be enhanced when touch optimization is performed in the firmware of a message passthrough MCU.

The touch HID layer 1008 implements the HID over USB protocol on the device side. Touch HID layer 1008 can allow the data received in HID over I2C or HID over SPI messages from touch controller 824, and the GPIO messages (e.g., interrupts) from touch controller 824 to passthrough to CPU 812 via the HID over USB protocol. In one example scenario, touch HID layer 1008 can receive requests for data (e.g., GET_REPORT) from CPU 812, and can query the protocol HAL layer 1004 as to whether an interrupt signal has been asserted by touch controller 824, for example, using the GPIO protocol. An interrupt signal may be asserted when the touch controller 824 has detected touch events and collected touch data to be transferred. Interrupts may be used in conjunction with various HID communication protocols including, but not necessarily limited to, HID over I2C protocol and HID over SPI protocol. If an interrupt signal has been asserted by touch controller 824, then the protocol HAL layer 1004 may request the data (e.g., input report) from the touch controller 824. The data, which may be optimized by touch optimization layer 1006, is passed to touch HID layer 1008, which repackages the data (e.g., an input report) in one or more USB packets. The one or more USB packets can be sent to CPU 812 via a USB host interface 928 over a USB.

In another example scenario, touch HID layer 1008 can receive requests to write data (e.g., SET_REPORT) from CPU 812. Touch HID layer 1008 can extract data (e.g., output report) in the received USB packet(s) from CPU 812 and provide the extracted data to protocol HAL layer 1004. The protocol HAL layer 1004 can send/write the extracted data (e.g., output report) to the touch controller 824 according to the appropriate protocol (e.g., HID over SPI or HID over I2C). It should be noted that other data, including for example feature reports and reset signals, may also be sent by CPU 812 to message passthrough MCU 840 and provided to touch controller 824 via the appropriate communication protocol (e.g., HID over SPI, HID over I2C, GPIO).

In one or more embodiments, message passthrough firmware 920 may also implement an optimized mapping to a USB low power link state and an SoC power management state to avoid a penalty in latency and system power consumption. The HID communication protocols implemented by touch screen, such as HID over SPI or HID over I2C, do not have the same power management commands as the HID over USB protocol. Accordingly, power commands for the HID over SPI or HID over I2C protocols may be mapped to USB power management messages. For example, the SET_POWER command power states of the HID over I2C protocol (e.g., 00=ON, 01=SLEEP) may be mapped to corresponding USB power management messages that correspond to power ON mode, NO POWER mode, and SLEEP mode. In this example, the mapping can be used to convert a USB power management message to the appropriate SET_POWER command for a touch screen implementing HID over I2C. Thus, when touching events are no longer detected, the touch screen 826 can go into the no power/ sleep mode. Similarly, the SET_POWER command power states of the HID over SPI protocol (e.g., ON, SLEEP, and OFF) may be mapped to the corresponding USB power management messages that correspond to power ON mode, NO POWER mode, and SLEEP mode.

It should be appreciated that various alternatives and/or modifications to the particular elements described above are intended to be within the scope of this application. For example, in addition to supporting HID over SPI, HID over I2C, and/or GPIO, one or more embodiments may be extended to support other HID protocols over USB such as UART. In this example, embodiments can be configured with suitable drivers and/or other firmware to support the other protocol(s). For example, HID conversion logic 926 of message passthrough firmware 920 may be configured with appropriate HID message conversion logic for the UART protocol. Also, interface 923 of message passthrough firmware 920 may include a UART interface to communicate with a HID device using the UART protocol.

In addition, embodiments can be modified to convert messages based on HID over low-speed protocols (e.g., SPI, I2C, GPIO, etc.), which originate from HID devices in a lid panel of computing device, to messages based on peripheral component interconnect express (PCIe), which are then transferred across a hinge of the computing device to a CPU disposed in a base panel. Additionally, a dedicated MCU is optional. Alternatively, the MCU firmware logic can be merged into one of the USB devices in the lid panel. Although embodiments have been described as having remote I/O devices disposed in a lid panel of a computing device and a motherboard with a CPU disposed in a base panel of the computing device, it should be apparent that the broad concepts of embodiments disclosed herein apply to any computing device structure (e.g., any number of panels, any movement between the panels, any shape or configuration of panels) where a CPU or other processing element is separated from one or more remote I/O devices by a hinge or other coupling means or space over which it is beneficial to limit the number of wires.

It should also be noted that a dedicated MCU, such as message converter MCU 240, is one possible implementation of a message conversion system. In another example, the logic of message passthrough firmware 920 could be merged into a USB device (or multiple USB devices) implemented in the lid panel.

Figure 11:
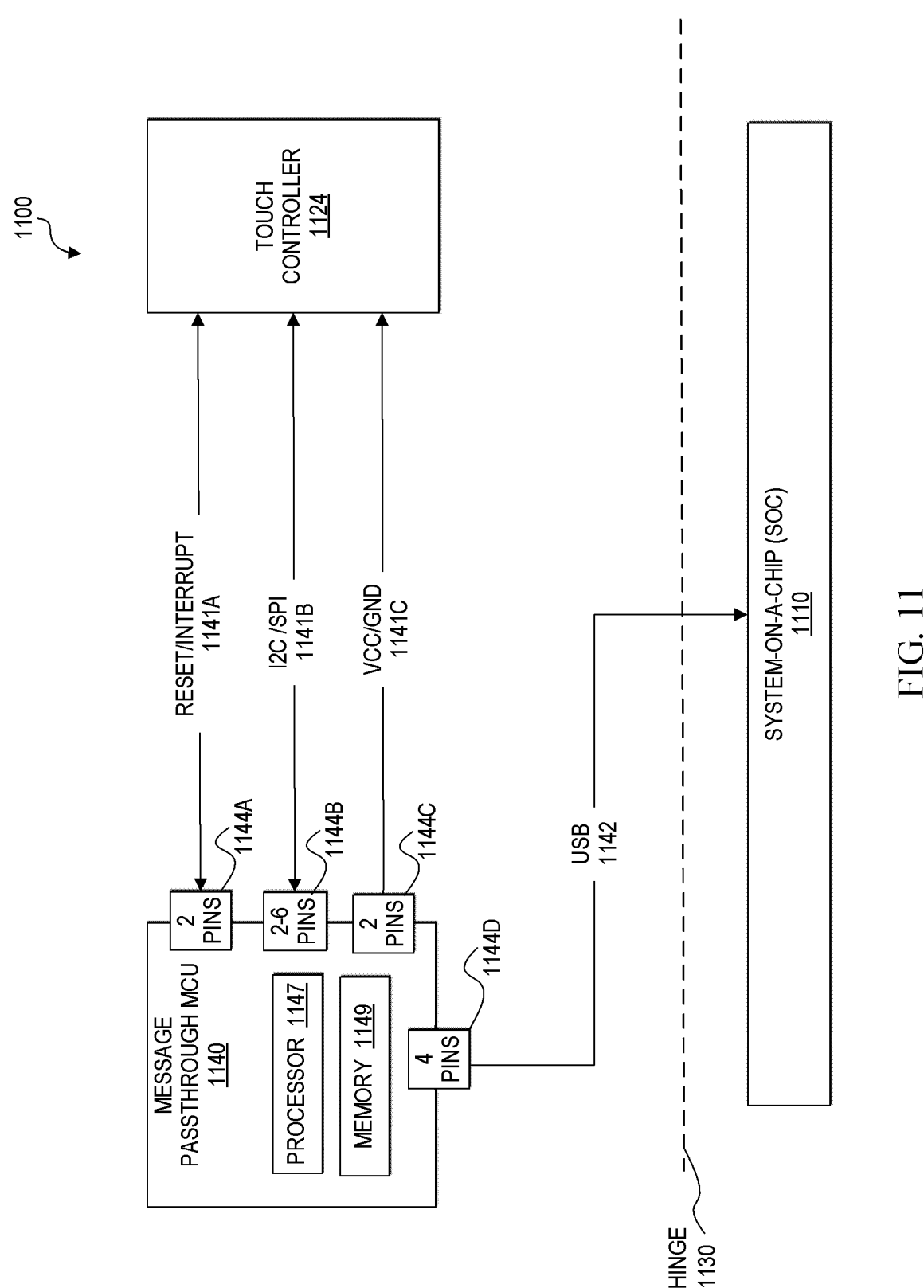
FIG. 11 is block diagram illustrating a hardware design of an example implementation of a HID message passthrough system according to at least one embodiment.

FIG. 11 is block diagram illustrating a hardware design 1100 of an example implementation of a HID message passthrough system according to at least one embodiment. The hardware design 1100 illustrates human interface device (HID) transfer protocol passthrough including a system-on-a-chip (SOC) 1110, a message passthrough MCU 1140, and a touch controller 1124, which is operably coupled to a touch screen (e.g., similar to touch screen 826). The SOC 1110 may be disposed in a base panel of a computing device, and the message passthrough MCU 1140 and touch controller 1124 may be disposed in a lid panel movably coupled to the base panel by a hinge 1130. The MCU may include a processor 1147 and memory 1149. In at least one example, message passthrough MCU 1140 may be configured in the same or similar manner as message passthrough MCU 840.

In this example, 2 to 6 pins, in addition to reset/interrupt and power/ground pins from the touch controller 1124 feed into the MCU 1122. The MCU 1122 converts the signals to high-speed signals and transmits them over a USB connection having only four (4) pins to SOC 1110. Once the signals are received, the SOC 412 converts the signals back to the original signals according to the appropriate communication protocol.

In this example, six to ten (6-10) total wires for communication from touch controller 1124 feed into the message passthrough MCU 1140. The reset/interrupt wires 1141A may include two wires according to GPIO protocol, I2C/SPI wires 1141B may include two wires for the HID over I2C protocol, or six wires for the HID over SPI protocol. The voltage and ground wires 1141C may include two wires. Accordingly, in this example, message passthrough MCU 1140 includes two pins 1144A (i.e., 2 GPIO pins) for asserting the touch controller to assert an interrupt signal or for the SOC to issue a reset signal. Message passthrough MCU 1140 also includes two to six pins 1144B (i.e., 2 I2C pins or 6 SPI pins) for I2C or SPI data, respectively, depending upon which HID device protocol is implemented by touch controller 1124. Additionally, message passthrough MCU 1140 can include two pins (i.e., 2 VCC/gnd pins) for power and ground signals between message passthrough MCU 1140 and touch controller 1124.

In hardware design 1100, a single USB bus 1142 extends across a hinge 1130 to connect message passthrough MCU 1140 to SOC 1110. Message passthrough MCU 1140 converts the messages from touch controller 1124 to high-speed USB messages and transmits them over the USB connection via only four (4) pins 1144D to SOC 1110. In this embodiment, converting the messages from touch controller 1124 is to bridge or passthrough the messages to SOC 1110. For example, data contained in a HID over I2C message or a HID over SPI message received from touch controller 1124 may be extracted and repackaged in one or more USB packets and sent over USB bus 1142 Once the USB messages are received by SOC 1110, SOC 1110 processes the USB message according to the HID over USB protocol.

In one or more embodiments of a HID message passthrough system, pins required for communication across a hinge, such as hinge 130 may be reduced by two to six pins (e.g., from 10 total pins to 4 USB pins or from 6 total pins to 4 USB pins). This advantageously results in a cost savings in addition to a significant industrial design value. By reducing the number of pins, other advanced touch features, such as touch smoothing, may be added, which can further promote the user experience and is further discussed below.

Turning to FIG. 12, FIG. 12 is a flowchart illustrating an example process 1200 associated with one or more embodiments of a HID message passthrough system in a computing device in which a message originates at a HID device and is sent to a processor. In one example, the HID device may be a touch screen with a touch controller disposed in a lid panel of a computing device, the processor may be disposed in a base panel of the computing device, and the lid panel and base panel may be movably coupled relative to each other via a hinge or other suitable mechanism. In at least one embodiment, one or more operations correspond to activities of FIG. 12. A message passthrough MCU (e.g., 840, 1140) including a firmware stack (e.g., 920), or a portion thereof, may perform or utilize at least some operations of the one or more operations. In at least one example, HID conversion logic 926 of message passthrough firmware 920 may perform one or more operations.

At 1202, the HID message passthrough MCU in the lid panel of the computing device receives a request from the processor in the base panel of the computing device for HID input data collected by the HID device (e.g., touch controller 824 of a touch screen 826) that is waiting to be transferred by the HID device. The USB message may be, for example, a GET_REPORT message according to the HID over USB protocol.

At 1204, a determination is made by the HID message passthrough MCU as to whether an interrupt is asserted by the HID device. In one example, an interrupt may be asserted by the HID device using a GPIO communication protocol. For example, a single GPIO pin may be used to assert an interrupt. For some communication protocols, a level trigger (e.g., at high or low level) may be used to assert the interrupt, for example, in the HID over I2C protocol. In other communication protocols, a falling (or rising) edge trigger may be used to assert the interrupt, for example, in the HID over SPI protocol.

As indicated at 1208, if it is determined that that an interrupt is not asserted by the HID device, then at 1210, a response may be sent to the processor to indicate that no HID input data is waiting to be transferred from the HID device. For a touch screen HID device, the response indicates that no touch events have been detected.

If it is determined that an interrupt is asserted by the HID device, then at 1212, the HID message passthrough MCU queries the HID device for input data, according to the particular HID protocol implemented by the HID device. For example, when using the HID over I2C protocol, the MCU reads the input report from the input register of the HID device. When using the HID over SPI protocol, an input report header may be read first, and then the input report may be read.

At 1214, one or more HID messages containing input data (e.g., input report) is received by the HID message passthrough MCU according to the HID protocol used by the HID device.

At 1216, the input data (e.g., input report) is extracted from the HID message(s). At 1218, one or more host messages (e.g., USB packets, PCIe packets, etc.) are generated with the input data extracted from the HID messages. The one or more host messages are generated based on the appropriate host communication protocol, such as HID over USB protocol.

At 1220, the HID message passthrough MCU sends the one or more USB messages to the processor in the base panel via a high-speed bus connecting the HID message passthrough MCU to the processor. The high-speed bus (e.g., USB bus, PCIe bus, etc.) may traverse a hinge that movably couples a base panel housing the processor and a lid panel housing the HID device.

Figure 13:
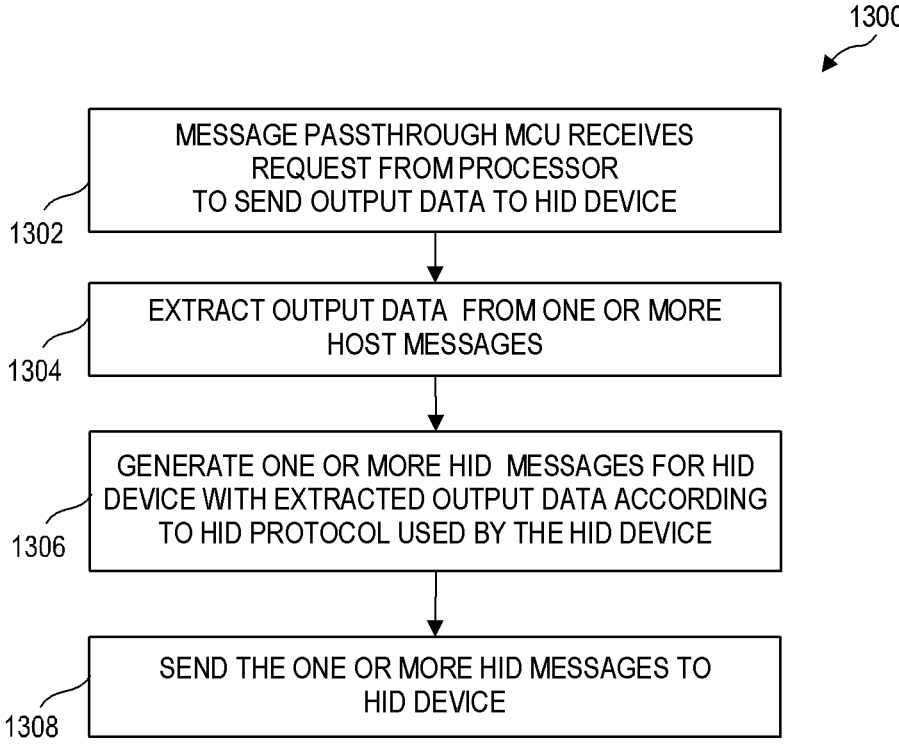
FIG. 13 is a flowchart illustrating another example process associated with a HID message passthrough system according to at least one embodiment.

FIG. 13 is a flowchart illustrating an example process 1300 associated with one or more embodiments of a HID message passthrough system in a computing device, in which a message originates at a processor and is sent to a HID device. In one example, the HID device may be a touch screen (e.g., 826) with a touch controller (e.g., 824) disposed in a lid panel of a computing device, the processor may be disposed in a base panel of the computing device, and the lid panel and base panel may be movably coupled relative to each other via a hinge or other suitable mechanism. In at least one embodiment, one or more operations correspond to activities of FIG. 13. A message passthrough MCU (e.g., 840, 1140) including a firmware stack (e.g., 920), or a portion thereof, may perform or utilize at least some operations of the one or more operations. In at least one example, HID conversion logic 926 of message passthrough firmware 920 may perform one or more operations.

At 1302, the HID message passthrough MCU receives one or more host messages (e.g., USB packets, PCIe packets, etc.) indicating a request from the processor in the base panel to send output data to the HID device. The host message may be, for example, a SET_REPORT message according to the HID over USB protocol.

At 1304, the output data (e.g., output report) is extracted from the one or more host messages received from the processor. At 1306, one or more HID messages are generated with the extracted output data from the one or more USB messages. The one or more HID messages are generated based on the HID protocol used by the HID device, such as HID over SPI or HID over I2C.

At 1308, the one or more HID messages are sent to the HID device based on the HID protocol used by the HID device.

Figure 14:
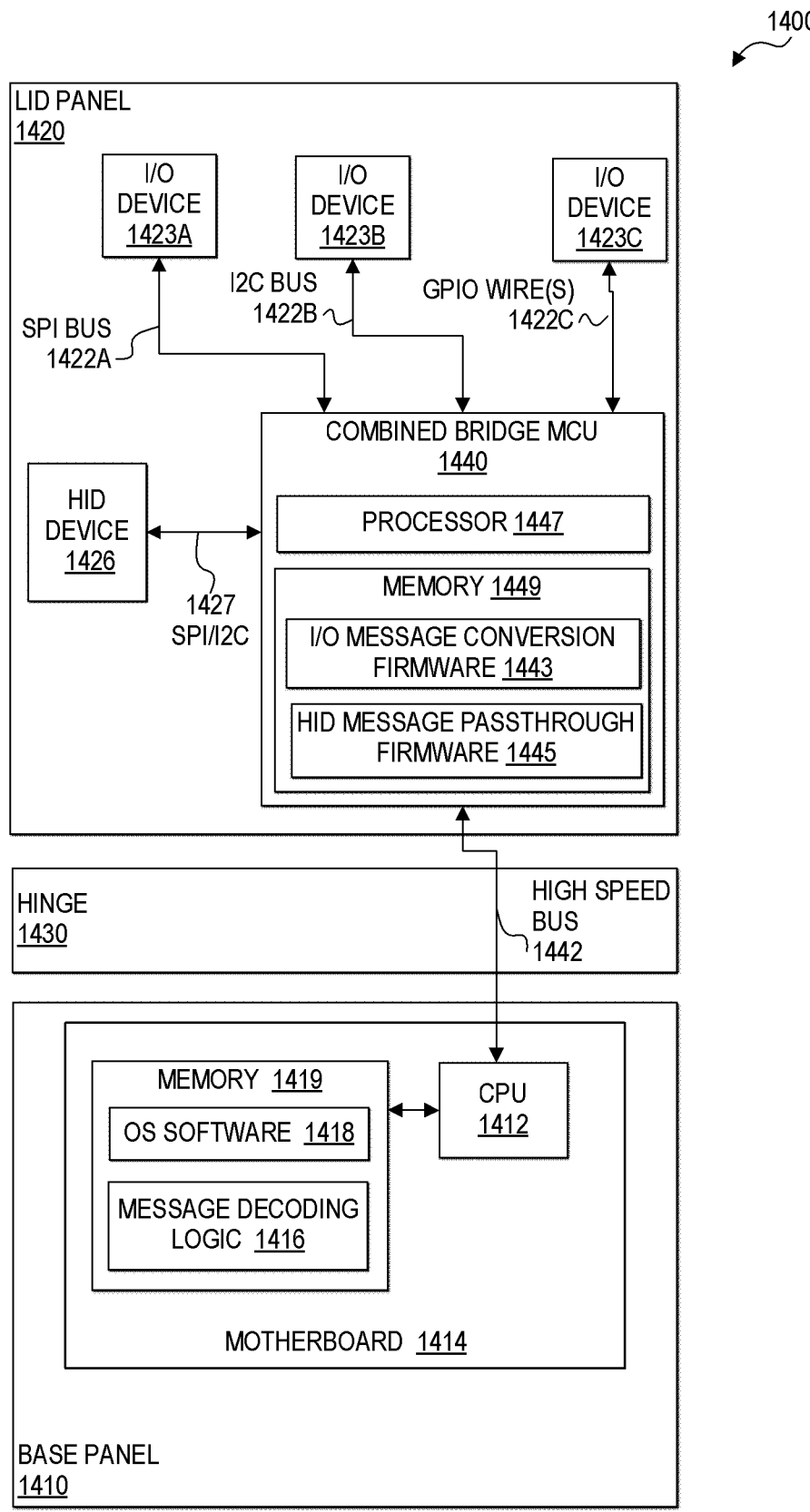
FIG. 14 is block diagram illustrating a hardware design of an example implementation of a combined I/O message conversion and HID message passthrough system according to at least one embodiment.

FIG. 14 is a block diagram illustrating an example computing device 1400 comprising a combined I/O message conversion and HID message passthrough system to reduce the number of pins across a hinge 1430 of the computing device according to at least one embodiment. In addition, latency and power consumption related to the HID device(s) are not negatively impacted in the system. Computing device 1400 includes a base panel 1410 and a lid panel 1420 connected by hinge 1430. Base panel 1410 can include a central processing unit (CPU) 1412 connected to, or integrated with, other computer components on a motherboard 1414 in base panel 210. For example, memory 1419 may be coupled to CPU 1412 and may store operating system software 1418 and message decoding logic 1416.

One or more I/O devices 1423A, 1423B, and 1423C can be provided in lid panel 1420. Communication protocols such as SPI, I2C, and GPIO can be used to transport low-speed input/output (I/O) signals (or messages) across respective communication channels corresponding to the I/O devices, including an SPI bus 1422A, an I2C bus 1422B, and GPIO wire(s) 1422C. In one or more embodiments, these messages can be converted into high-speed I/O messages based on the USB protocol or other suitable protocol such as PCIe. Once converted, the USB packets can be transmitted across hinge 1430 to CPU 1412. At CPU 1412, the operating system software 1418 can convert the received USB packets back to the original messages according to the appropriate I2C, GPIO, or SPI communication protocol. It should be noted that some I/O devices may include multiple communication channels using different protocols. For example, a camera may include an I2C bus and a GPIO wire, a sensor module may include a SPI bus and a GPIO wire.

Lid panel 1420 can also include one or more HID devices, such as HID device 1426. Any suitable HID device may be disposed in lid panel 1420 including, but not necessarily limited to, a touch screen coupled to a touch controller. Communication protocols for human interface devices (HIDs), such as HID over I2C and HID over SPI, can be used to transport messages to and from HID device 1426.

Embodiments herein can passthrough low-speed HID messages (e.g., based on HID over I2C or HID over SPI) to CPU 1412 by bridging the low-speed HID messages to high-speed HID messages, such as HID over USB. The HID over USB messages can be transmitted to CPU 1412 over a USB bus (e.g., a high-speed bus 1442) that traverses hinge 1430. Because the HID over USB protocol is natively supported by an operating system in CPU 1412, the HID over USB message does not need to be converted back to the original protocol, but instead, can be interpreted and processed based on the HID over USB protocol.

In at least one embodiment, any suitable hardware, firmware, and/or software may be provided in lid panel 1420 to function as a bridge that connects the remote I/O devices and HID device(s) in lid panel 1420 to CPU 1412 in base panel 1410 over other communication protocols that use fewer wires. The hardware, firmware, and/or software may be embodied as any suitable integrated circuit that can perform I/O message conversion and HID message passthrough operations disclosed herein and that is sized for placement in a lid panel of the computing device. In one example, a combined bridge microcontroller unit (MCU) 1440 may be embedded in lid panel 1420 of computing device 1400 to perform the I/O message conversion and HID message passthrough operations. In other embodiments, other components that implement suitable communication protocols (e.g., USB, PCIe, HID over USB, HID over PCIe, etc.) to communicate with the CPU in the base panel may be leveraged with appropriate firmware and/or software to bridge I/O devices and HID devices in the lid panel through those other components to the CPU in the base panel.

Combined bridge MCU 1440 can include a processor 1447 and memory 1449. In at least one example, processor 1447 may be similar to processors 247 and/or 847, and memory 1449 may be similar to memories 249 and/or 849.

In one or more embodiments, combined bridge MCU 1440 can be communicatively coupled to I/O devices 1423A-1423C through interfaces based on communication protocols SPI, I2C, and GPIO, respectively. Each interface can include one or more pins on the MCU depending on the particular requirements of the communication protocol for that interface. Combined bridge MCU 1440 is configured to send messages to and/or receive messages from remote I/O devices 1423A, 1423B, and 1423C over SPI bus 1422A, I2C bus 1422B, and GPIO wire(s) 1422C, respectively. An appropriate number of pins may be provided in combined bridge MCU 1440 to facilitate communication to and from each remote I/O device based on the communication protocol used by that remote I/O device, as previously described herein with respect to message converter MCU 240 of FIG. 2.

Combined bridge MCU 1440 is also communicatively coupled to HID device(s) 1426 through an interface(s) based on communication protocols HID over SPI and/or HID over I2C. An interface for a HID device can include one or more pins on the MCU depending on the particular requirements of the communication protocol for the interface. In some implementations, message passthrough MCU 840 can be communicatively coupled to multiple HID devices through multiple interfaces based on multiple protocols (e.g., HID over SPI, HID over I2C, etc.). The MCU is configured to send messages to and/or receive messages from HID device 1426 over an SPI or I2C bus 1427, depending on which communication protocol is implemented by the HID device. An appropriate number of pins may be provided in the combined bridge MCU 1440 to facilitate communication to and from HID device 1426 based on the communication protocol used by the HID device, as previously described herein with respect to message passthrough MCU 840 of FIG. 8.

Combined bridge MCU 1440 can also be connected to CPU 1412 using the USB communication protocol and the HID over USB protocol. It should be noted that other high-speed protocols may be used instead, such as PCIe and HID over PCIe, for example. Combined bridge MCU 1440 is configured to send I/O-related messages to and/or receive I/O-related messages from CPU 1412 using high-speed bus 1442 based on the USB protocol, and to multiplex HID-related messages on the same high-speed bus 1442.

In at least one embodiment, combined bridge MCU 1440 may be configured as a multi-function hub to perform an I/O message conversion function and a HID message passthrough function. I/O message conversion firmware 1443 corresponds to the I/O conversion function and HID message passthrough firmware 1445 corresponds to the HID message passthrough function. In one or more embodiments, I/O message conversion firmware 1443 may include at least some of the message conversion firmware 320 of FIG. 3 (e.g., I/O conversion logic 326), and HID message conversion firmware 1445 may include at least some of the message passthrough firmware 920 of FIGS. 9-10 (e.g., HID conversion logic 926, configure parameter 1002).

The I/O message conversion function may be performed in a similar manner as previously described with reference to FIGS. 2-7. For example, combined bridge MCU 1440 can receive a message that is sent using a low-speed protocol (e.g., SPI, I2C, or GPIO) from an I/O device 1423A, 1423B, or 1423C. The I/O message conversion firmware 1443 can convert the received message to a message based on the USB protocol, or other high-speed protocol. The converted message is sent to CPU 1412 via high-speed bus 1442 (e.g., USB bus) across hinge 1430. Conversely, the MCU 1440 can receive a message based on a high-speed protocol (e.g., USB) from CPU 1412. I/O message conversion firmware 1443 can convert the received message to a message based on an appropriate low-speed protocol (e.g., SPI, I2C, or GPIO) depending on a protocol type indicated in the received message. The converted message may be sent via a low-speed bus or wire(s) (e.g., SPI bus 1422A, I2C bus 1422B, or GPIO wire(s) 1422C) to the appropriate destination I/O device 1423A, 1423B, or 1423C.

The HID message passthrough function may be performed in a similar manner as previously described with reference to FIGS. 8-13. For example, combined bridge MCU 1440 can receive a message that is sent using a low-speed HID protocol (e.g., HID over I2C, HID over SPI) from a HID device 1426. The HID message passthrough firmware 1445 can convert the input HID message to a HID over USB message, or other high-speed HID protocol. The HID over USB message is multiplexed on the same USB bus (e.g., high-speed bus 1442) across hinge 1430 over which the converted I/O messages are sent. Conversely, if an operating system running on CPU 1412 has a message (e.g., command, read/write request, etc.) to communicate to HID device 1426, then a HID over USB message is sent to MCU 1440 via the USB bus. The HID message passthrough firmware 1445 in MCU 1440 can convert the HID over USB message to a HID over I2C message or a HID over SPI message, depending on which protocol is used by HID device 1426. The generated HID over SPI or HID over I2C message can be sent to HID device 1426 via an SPI or I2C interface to the SPI or I2C bus 1427, depending on which communication protocol is used by HID device 1426.

Regarding operations on the base panel side, memory 1419 can store operating system (OS) software 1418, which can include or interact with message decoding logic 1416. In one or more embodiments, OS software 1418 may be configured with OS software 310 and BIOS software 330 as illustrated and described with reference to FIG. 3 to process messages from and to I/O devices in the lid panel 1420 via combined bridge MCU 1440 and based on appropriate protocols such as SPI, I2C, GPIO, and/or UART. In addition, the OS software 1418 may be further configured with OS software 910 illustrated and described with reference to FIG. 9 to process messages to and from HID device(s) in the lid panel 1420 via combined bridge MCU 1440 and based on appropriate HID protocols (e.g., HID over SPI, HID over I2C). Additionally, since combined bridge MCU 1440 may be a multi-function hub, message decoding logic 1416 may be provided as part of OS software 1418, or may interact with OS software 1418, to determine which logical function is associated with a particular message received over the high-speed bus 1442. Once a determination is made, then the appropriate firmware (e.g., I/O message conversion firmware 1443 or HID message passthrough firmware 1445) can be invoked.

In one or more embodiments, a combined bridge MCU 1440 (or a message passthrough MCU 840) or any other component or hardware that bridges low-speed HID messages to high-speed HID messages may be connected to multiple HID devices to be connected to be bridged to the CPU over the same high-speed bus. Thus, the MCU or other component may include interfaces based on multiple HID communication protocols. For example, combined bridge MCU 1440 may be communicatively coupled to a first HID device (e.g., touch screen 826) through a first interface based on the HID over SPI protocol, and to a second HID device through a second interface based on the HID over I2C protocol.

It should be appreciated that various alternatives and/or modifications to the particular elements described above are intended to be within the scope of this application. Embodiments and alternatives applicable to an I/O message conversion system (e.g., FIGS. 2-7) and/or to a HID message passthrough system (FIGS. 8-13) are also applicable to systems implementing combined bridge MCU 1440 or the functionality thereof. For example, embodiments combining I/O message conversion and HID message passthrough functionality, as shown and described at least with reference to FIG. 14, may be extended to support other protocols over USB such as UART. Additionally, these embodiments may be extended to support conversion of messages from I/O protocols (e.g., SPI, I2C, GPIO, UART, etc.) and HID protocols (e.g., HID over SPI, HID over I2C, HID over UART, etc.) to messages based on high-speed protocols other than USB, such as PCIe for example.

Although embodiments have been described as having remote I/O devices and HID devices disposed in a lid panel of a computing device and a processing system (e.g., motherboard with a CPU, SOC, etc.) disposed in a base panel of the computing device, it should be apparent that the broad concepts of embodiments disclosed herein apply to any computing device structure (e.g., any number of panels, any movement between the panels, any shape or configuration of panels) where a CPU or other processing element is separated from one or more remote I/O devices and one or more HID devices by a hinge or other coupling means or space, over which it is beneficial to limit the number of wires. For example, computing devices in which any of the embodiments described herein (e.g., message conversion system, message passthrough system, combined message conversion and passthrough system) may be implemented include, but are not necessarily limited to, dual display devices having two or more panels (e.g., a lid portion and a base portion)

coupled by a hinge or other coupling means that allows movement of the panels relative to each other, and a foldable computing device employing technology (e.g., flexible organic light-emitting diode (FOLED)) that enables a screen to fold or bend while still operating. Additionally, any of the embodiments are applicable to devices other than laptops including, for example, smart phones, tablets, notepads, or other handheld devices, that are configured with a hinge or other coupling means that allows two or more panels, members, or other portions to move, fold, bend, or rotate relative to each other. Such devices may be configured as dual display or foldable devices in some scenarios.

Additionally, although the various embodiments are described herein as implementing some portions of conversion and passthrough functionality in firmware (e.g., 320, 920), it should be appreciated that conversion logic (e.g., I/O conversion logic 326, HID conversion logic 926) could be implemented in hardware, software, firmware, or any suitable combination thereof. Similarly, it should be appreciated that other portions of conversion and passthrough functionality that are shown and described herein in software (e.g., virtual I/O drivers 315A-315C, USB bridge driver 316) could be implemented in hardware, software, firmware, or any suitable combination thereof.

Figure 15:
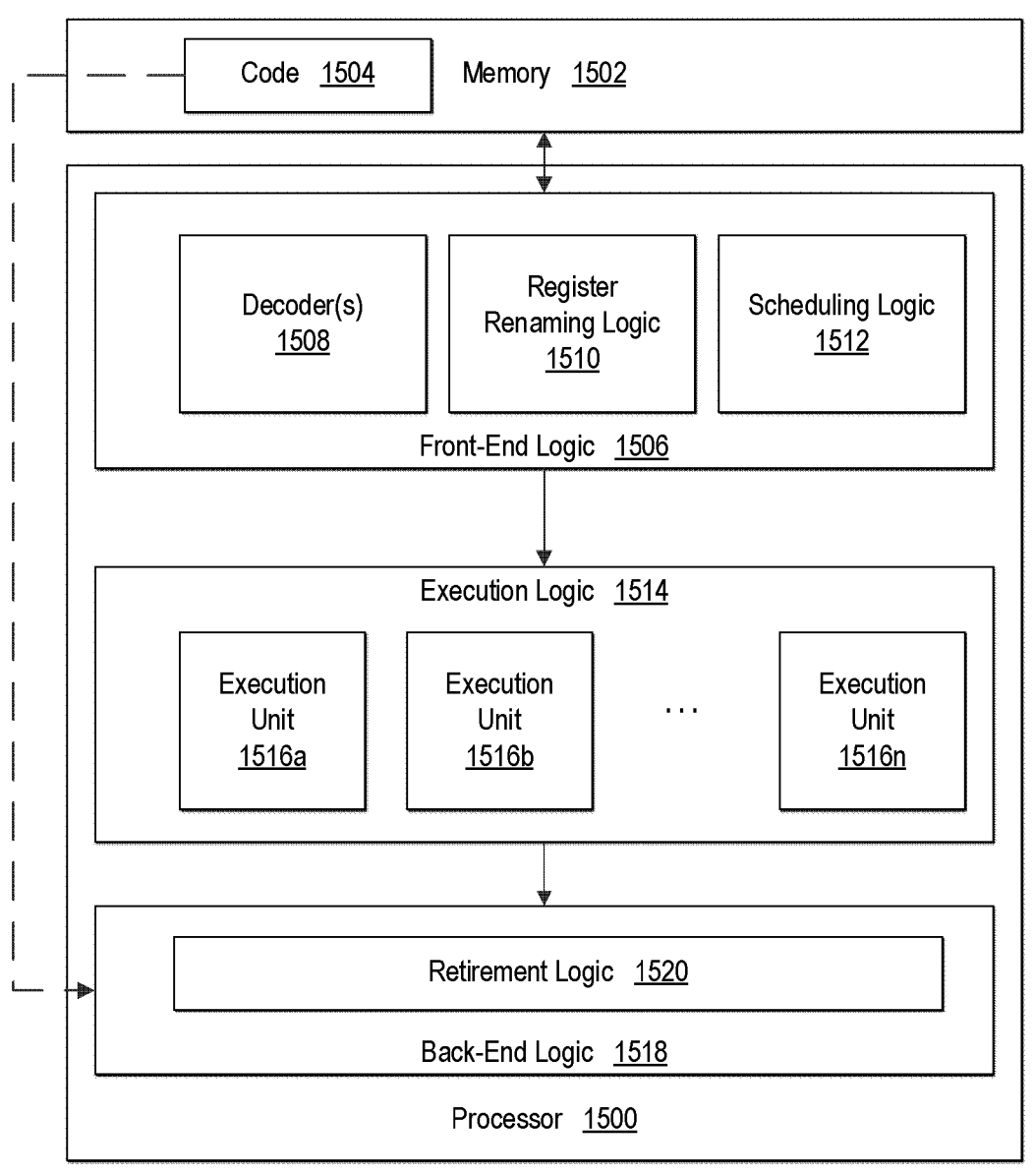
FIG. 15 is a block diagram of computing device components that may be provided in a base panel of one or more embodiments described herein.
Figure 16:
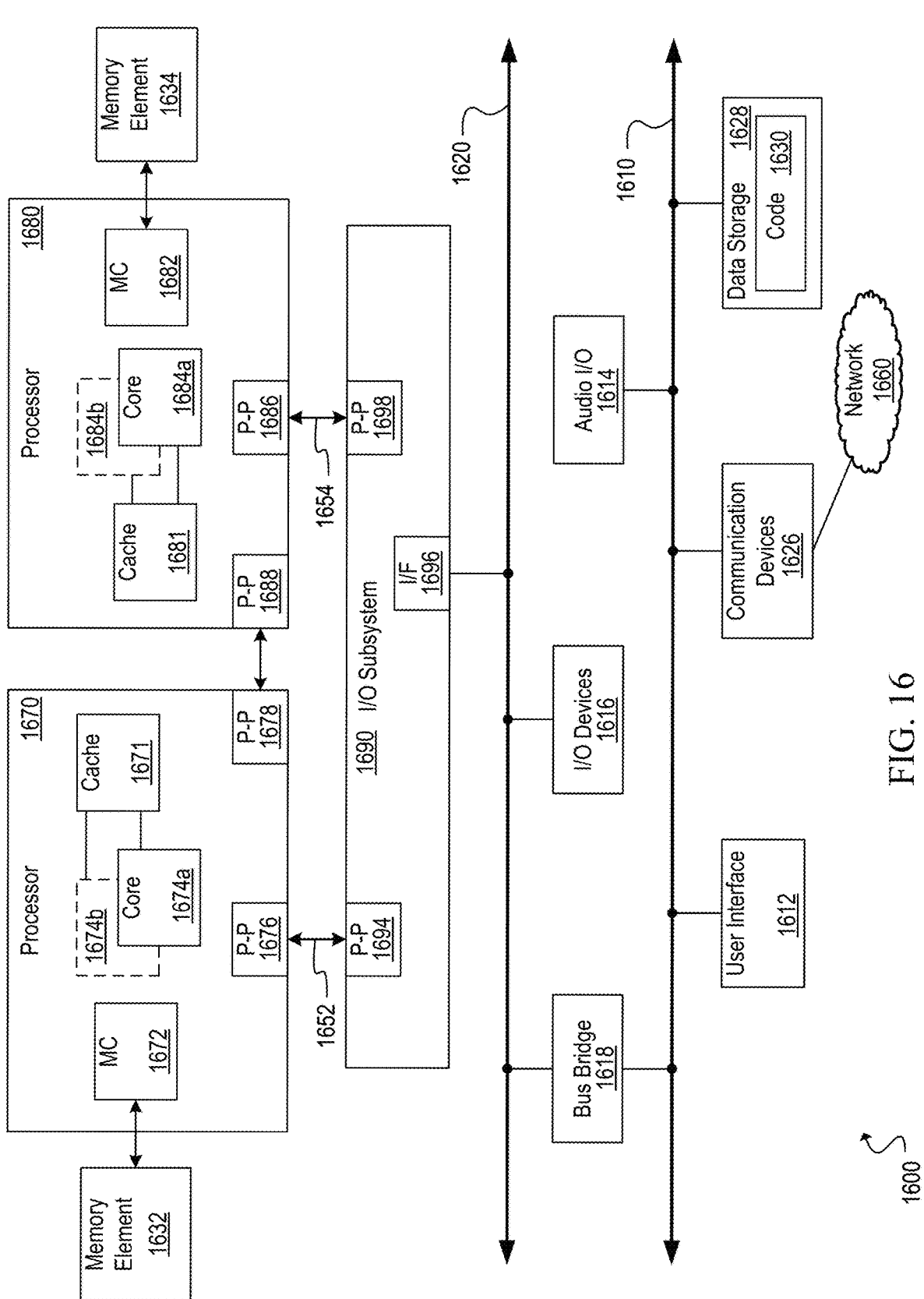
FIG. 16 is a block diagram of computing device components that may be provided in a base panel and a lid panel in one or more embodiments described herein.

FIGS. 15-16 are block diagrams of exemplary computer architectures that may be used in accordance with embodiments disclosed herein. Other computer architecture designs known in the art for processors and computing systems may also be used. Generally, suitable computer architectures for embodiments disclosed herein can include, but are not limited to, configurations illustrated in FIGS. 15-16.

FIG. 15 is an example illustration of a processor according to an embodiment. Processor 1500 is an example of a type of hardware device that can be used in connection with the implementations above. For example, processor 1500 shows one example architecture of various processing elements (e.g., 212, 247, 410, 447, 812, 847, 1110, 1147, 1447) in one or more embodiments shown and described herein. Processor 1500 may be any type of processor, such as a microprocessor, an embedded processor, a digital signal processor (DSP), a network processor, a multi-core processor, a single core processor, or other device to execute code. Although only one processor 1500 is illustrated in FIG. 15, a processing element may alternatively include more than one of processor 1500 illustrated in FIG. 15. Processor 1500 may be a single-threaded core or, for at least one embodiment, the processor 1500 may be multi-threaded in that it may include more than one hardware thread context (or "logical processor") per core.

FIG. 15 also illustrates a memory 1502 coupled to processor 1500 in accordance with an embodiment. Memory 1502 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 1500 can execute any type of instructions associated with algorithms, processes, or operations detailed herein. Generally, processor 1500 can transform an element or an article (e.g., data) from one state or thing to another state or thing.

Code 1504, which may be one or more instructions to be executed by processor 1500, may be stored in memory 1502, or may be stored in software, hardware, firmware, or any suitable combination thereof, or in any other internal or external component, device, element, or object where appropriate and based on particular needs. In one example, processor 1500 can follow a program sequence of instructions indicated by code 1504. Each instruction enters a front-end logic 1506 and is processed by one or more decoders 1508. The decoder may generate, as its output, a micro operation such as a fixed width micro operation in a predefined format, or may generate other instructions, microinstructions, or control signals that reflect the original code instruction. Front-end logic 1506 also includes register renaming logic 1510 and scheduling logic 1512, which generally allocate resources and queue the operation corresponding to the instruction for execution.

Processor 1500 can also include execution logic 1514 having a set of execution units 1516a, 1516b, 1516n, etc. Some embodiments may include a number of execution units dedicated to specific functions or sets of functions. Other embodiments may include only one execution unit or one execution unit that can perform a particular function. Execution logic 1514 performs the operations specified by code instructions.

After completion of execution of the operations specified by the code instructions, back-end logic 1518 can retire the instructions of code 1504. In one embodiment, processor 1500 allows out of order execution but requires in order retirement of instructions. Retirement logic 1520 may take a variety of known forms (e.g., re-order buffers or the like). In this manner, processor 1500 is transformed during execution of code 1504, at least in terms of the output generated by the decoder, hardware registers and tables utilized by register renaming logic 1510, and any registers (not shown) modified by execution logic 1514.

Although not shown in FIG. 15, a processing element may include other elements on a chip with processor 1500. For example, a processing element may include memory control logic along with processor 1500. The processing element may include I/O control logic and/or may include I/O control logic integrated with memory control logic. The processing element may also include one or more caches. In some embodiments, non-volatile memory (such as flash memory or fuses) may also be included on the chip with processor 1500.

FIG. 16 illustrates a computing system 1600 that is arranged in a point-to-point (PtP) configuration according to an embodiment. In particular, FIG. 16 shows a system where processors, memory, and input/output devices are interconnected by a number of point-to-point interfaces. Generally, one or more of the computing systems or devices (e.g., 200, 400, 800, 1100, 1400) described herein may be configured in the same or similar manner as computing system 1600. Additionally, one or more of the microcontrollers (e.g., 240, 440, 840, 1140, 1440) may be configured in a similar manner as shown and described with reference to computing system 1600.

Processors 1670 and 1680 may also each include integrated memory controller logic (MC) 1672 and 1682 to communicate with memory elements 1632 and 1634. In alternative embodiments, memory controller logic 1672 and 1682 may be discrete logic separate from processors 1670 and 1680. Memory elements 1632 and/or 1634 may store various data to be used by processors 1670 and 1680 in achieving operations and functionality outlined herein.

Processors 1670 and 1680 may be any type of processor, such as those discussed in connection with other figures. Processors 1670 includes a single core 1674a or multiple cores 1674a-1674b, and processor 1680 includes a single core 1684a or multiple cores 1684a-1684b. Processors 1670 and 1680 each include a cache 1671 and 1681 used by their respective cores. Processors 1670 and 1680 may exchange data via a point-to-point (PtP) interface 1650 using point-to-point interface circuits 1678 and 1688, respectively. Processors 1670 and 1680 may each exchange data with a chipset 1690 via individual point-to-point interfaces 1652 and 1654 using point-to-point interface circuits 1676, 1686, 1694, and 1698. Chipset 1690 may also exchange data with a co-processor 1638, such as a high-performance graphics circuit, machine learning accelerator, or other co-processor 1638, via an interface 1639, which could be a PtP interface circuit. In alternative embodiments, any or all of the PtP links illustrated in FIG. 16 could be implemented as a multi-drop bus rather than a PtP link.

Chipset 1690 may be in communication with a bus 1620 via an interface circuit 1696. Bus 1620 may have one or more devices that communicate over it, such as a bus bridge 1618 and I/O devices 1616. Via a bus 1610, bus bridge 1618 may be in communication with other devices such as a user interface 1612 (such as a keyboard, mouse, touchscreen, or other input devices), communication devices 1626 (such as modems, network interface devices, or other types of communication devices that may communicate through a computer network 1660), audio I/O devices 1614, and/or a data storage device 1628. Data storage device 1628 may store code 1630, which may be executed by processors 1670 and/or 1680. In alternative embodiments, any portions of the bus architectures could be implemented with one or more PtP links.

The computer system depicted in FIG. 16 is a schematic illustration of an embodiment of a computing system that may be utilized to implement various embodiments discussed herein. It will be appreciated that various components of the system depicted in FIG. 16 may be combined in a system-on-a-chip (SoC) architecture or in any other suitable configuration capable of achieving the functionality and features of examples and implementations provided herein.

While some of the systems and solutions described and illustrated herein have been described as containing or being associated with a plurality of elements, not all elements explicitly illustrated or described may be utilized in each alternative implementation of the present disclosure. Additionally, one or more of the elements described herein may be located external to a system, while in other instances, certain elements may be included within or as a portion of one or more of the other described elements, as well as other elements not described in the illustrated implementation. Further, certain elements may be combined with other components, as well as used for alternative or additional purposes in addition to those purposes described herein.

Further, it should be appreciated that the examples presented above are non-limiting examples provided merely for purposes of illustrating certain principles and features and not necessarily limiting or constraining the potential embodiments of the concepts described herein. For instance, a variety of different embodiments can be realized utilizing various combinations of the features and components described herein, including combinations realized through the various implementations of components described herein. Other implementations, features, and details should be appreciated from the contents of this Specification.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Other variations are within the scope of the following claims.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that at least some of the described components can generally be integrated with other components illustrated herein or not.

Embodiments of the mechanisms disclosed herein may be implemented in hardware, software, firmware, or a combination of such implementation approaches. Embodiments of this disclosure may be implemented, at least partially, as computer programs, program code, and/or firmware executing on programmable systems comprising at least one processor, a storage system (including volatile and non-volatile memory and/or storage elements), at least one input device, and at least one output device.

Program code, such as code 1504 illustrated in FIG. 15, code 1630 illustrated in FIG. 16, may be applied to input instructions to perform at least some of the functions described herein and generate output information. For example, operating system software 310 and 910 may be examples of program code. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

Firmware, such as message conversion firmware 320 and message passthrough firmware 920, may be applied to input instructions to perform at least some of the functions described herein and generate output information. The output information may be applied to one or more output devices, in known fashion. In one or more embodiments, firmware may be stored in read-only memory or in flash read-only memory.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, flash ROMs, electrically erasable programmable read-only memories (EEPROMs), phase change memory (PCM), magnetic or optical cards, or any other type of media suitable for storing electronic instructions.

Accordingly, embodiments of this disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

With regard to this specification generally, unless expressly stated to the contrary, use of the phrases 'at least one of' and 'one or more of' refers to any combination of the named elements, conditions, activities, messages, protocols, interfaces, or devices. For example, 'at least one of X, Y, and Z' and 'one or more of X, Y, and Z' is intended to mean any of the following: 1) at least one X, but not Y and not Z; 2) at least one Y, but not X and not Z; 3) at least one Z, but not X and not Y; 4) at least one X and at least one Y, but not Z; 5) at least one X and at least one Z, but not Y; 6) at least one Y and at least one Z, but not X; or 7) at least one X, at least one Y, and at least one Z. Additionally, unless expressly stated to the contrary, the terms 'first', 'second', 'third', etc., are intended to distinguish the particular items (e.g., element, condition, module, activity, operation, claim element, messages, protocols, interfaces, devices etc.) they modify, but are not intended to indicate any type of order, rank, importance, temporal sequence, or hierarchy. For example, 'first X' and 'second X' are intended to designate two separate X elements that are not necessarily limited by any order, rank, importance, temporal sequence, or hierarchy of the two elements, unless specifically stated to the contrary.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of "embodiment" and other exemplarily language does not necessarily refer to the same embodiment or the same example, but may refer to different and distinct embodiments, as well as potentially the same embodiment.

OTHER NOTES AND EXAMPLES

The following examples pertain to embodiments in accordance with this Specification.

The following examples pertain to embodiments in accordance with this specification. Example S1 provides a system including a first processor disposed within a lid portion of a computing device including a screen. The first processor is communicatively coupled to a plurality of input/output (I/O) devices according to a plurality of I/O communication protocols via a first number of wires. They system further includes a first memory coupled to the first processor to store first instructions that, and when executed by the first processor, the first instructions cause the first processor to receive, from a first I/O device of the plurality of I/O devices, a first message according to a first I/O communication protocol of the plurality of I/O communication protocols, convert the first message to a second message according to a host communication protocol, and send the second message over a bus containing a second number of wires traversing a hinge movably coupling the lid portion to a base portion of the computing device. In the system, the second number of wires is less than the first number of wires.

Example S2 comprises the subject matter of Example S1, and the first processor is communicatively coupled to a human interface device (HID) according to a first HID communication protocol via a third number of wires.

Example S3 comprises the subject matter of Example S2, and the first memory is to store second instructions that, when executed by the first processor, cause the first processor to receive a third message according to the first HID communication protocol from the human interface device, wherein the third message is to contain input data, and generate a fourth message according to a second HID communication protocol. The fourth message is to contain the input data. The second message of the host communication protocol and the fourth message of the second HID communication protocol are to be multiplexed onto the second number of wires traversing the hinge.

Example S4 comprises the subject matter of Example S3, and the second instructions, when executed by the first processor, cause the first processor further to, prior to generating the fourth message, extract the input data from the third message and run a touch optimization algorithm to optimize the input data.

Example S5 comprises the subject matter of any one of Examples S3-S4, and the second instructions, when executed by the first processor, cause the first processor further to, in response to receiving a first host power state command in a fifth message according to the second HID communication protocol via the second number of wires, identify a first HID power state command corresponding to the first host power state command based on power state command information, the power state command information including one or more HID power state commands associated with the human interface device mapped to one or more host power state commands associated with the second HID communication protocol.

Example S6 comprises the subject matter of any one of Examples S3-S5, and the second HID communication protocol is a HID over universal serial bus (HID over USB) protocol or a HID over peripheral component interconnect (PCIe) protocol (HID over PCIe).

Example S7 comprises the subject matter of any one of Examples S3-S6, and the first HID communication protocol is a HID over serial peripheral interface (HID over SPI) protocol or a HID over inter-integrated circuit (HID over I2C) protocol.

Example S8 comprises the subject matter of any one of Examples S1-S7, and to convert the first message to the second message is to include determining a transaction type of the first message, and encapsulating the first message, the transaction type of the first message, and a protocol type of the first message in a packet.

Example S9 comprises the subject matter of any one of Examples S1-S8, and further comprising a second processor in the base portion of the computing device. The second processor is coupled to a second memory, and the second memory is to store operating system instructions that, when executed by the second processor, cause the second processor to receive the second message from the first processor, determine a protocol type indicated in the second message, and in response to determining that the protocol type indicated in the second message corresponds to the first I/O communication protocol, convert the second message to the first message according to the first I/O communication protocol.

Example S10 comprises the subject matter of Example S9, and the operating system instructions, when executed by the second processor, are to cause the second processor further to, prior to determining the protocol type indicated in the second message, determine whether the second message is associated with a first logical function corresponding to the first instructions or a second logical function corresponding to second instructions stored in the first memory coupled to the first processor, and the protocol type is to be determined in response to determining that the second message is associated with the first logical function corresponding to the first instructions.

Example S11 comprises the subject matter of any one of Examples S9-S10, and the operating system instructions, when executed by the second processor, are to cause the second processor further to provide the first message to a virtual input/output (I/O) driver corresponding to the first I/O communication protocol to enable a software application running on the second processor to access the first message.

Example S12 comprises the subject matter of any one of Examples S9-S11, and the operating system instructions, when executed by the second processor, are to cause the second processor further to receive a sixth message to be sent to a second I/O device of the plurality of I/O devices in the lid portion, determine that a second I/O communication protocol of the plurality of I/O communication protocols is to be used to send the sixth message to the second I/O device, encapsulating the sixth message, a transaction type of the sixth message, and a protocol type of the sixth message in a seventh message according to the host communication protocol, and sending the seventh message via the bus to the first processor.

Example A1 provides an apparatus that includes a first processor, a first plurality of pins to support a plurality of input/output (I/O) communication protocols associated with a first plurality of wires to communicatively couple the first processor to a plurality of I/O devices disposed in a first panel of a computing device, a second plurality of pins to support a host communication protocol associated with a second plurality of wires to communicatively couple the first processor to a second processor in a second panel of the computing device, and memory coupled to the first processor. The memory is to store first instructions that, when executed by the first processor, cause the first processor to receive a first message from a first I/O device of the plurality of I/O devices according to a first I/O communication protocol of the plurality of I/O communication protocols, convert the first message to a second message based on the host communication protocol, and send the second message to the second processor via the second plurality of wires, wherein the second plurality of wires includes fewer wires than the first plurality of wires.

Example A2 comprises the subject matter of Example A1, and further comprising a third plurality of pins to support a first human interface device (HID) communication protocol associated with a third plurality of wires to communicatively couple the first processor to a human interface device.

Example A3 comprises the subject matter of Example A2, and the second instructions, when executed by the first processor, cause the first processor to receive a third message according to the first HID communication protocol from the human interface device and the third message is to contain input data, and to generate a fourth message according to a second HID communication protocol and the fourth message is to contain the input data. The second message of the host communication protocol and the fourth message of the HID second communication protocol are to be multiplexed onto the second plurality of wires to traverse a hinge movably coupling the first panel to the second panel.

Example A4 comprises the subject matter of Example A3, and the second instructions, when executed by the first processor, cause the first processor further to, prior to generating the fourth message, extract the input data from the third message, and run a touch optimization algorithm to optimize the input data.

Example A5 comprises the subject matter of any one of Examples A3-A4, and the second instructions, when executed by the first processor, cause the first processor further to, in response to receiving a first host power state command in a fifth message according to the second HID communication protocol via the second plurality of wires, identify a first HID power state command corresponding to the first host power state command based on power state command information, the power state command information including one or more HID power state commands associated with the human interface device mapped to one or more host power state commands associated with the second HID communication protocol.

Example A6 comprises the subject matter of any one of Examples A3-A5, and the second HID communication protocol is a HID over universal serial bus (HID over USB) protocol or a HID over peripheral component interconnect (PCIe) protocol (HID over PCIe).

Example A7 comprises the subject matter of any one of Examples A3-A6, and the first HID communication protocol is a HID over serial peripheral interface (HID over SPI) protocol or a HID over inter-integrated circuit (HID over I2C) protocol.

Example A8 comprises the subject matter of any one of Examples A1-A7, and to convert the first message to the second message is to include determining a transaction type of the first message, and encapsulating the first message, the transaction type of the first message, and a protocol type of the first message in a packet.

Example A9 comprises the subject matter of any one of Examples A1-A8, and the first instructions, when executed by the first processor, cause the first processor further to receive a sixth message from the second processor via the second plurality of wires, wherein a seventh message is contained in the sixth message, determine a protocol type indicated in the sixth message, in response to determining that the protocol type indicated in the sixth message corresponds to the first I/O communication protocol, convert the sixth message to the seventh message according to the first I/O communication protocol, and send the seventh message to the first I/O device according to the first I/O communication protocol.

Example A10 comprises the subject matter of any one of Examples A1-A9, and the second plurality of pins are to connect to the second processor by a plurality of wires traversing a hinge movably coupling the first panel to the second panel.

Example C1 provides one or more machine readable storage media comprising instructions for execution that when executed by a first processor, cause the first processor to receive, from a first input/output (I/O) device of a plurality of I/O devices in a lid portion of a computing device including a screen, a first message based on a first I/O communication protocol of a plurality of I/O communication protocols associated with a first plurality of wires to connect the first processor to the plurality of I/O devices, convert the first message to a second message based on a host communication protocol associated with a second plurality of wires to connect the first processor to a second processor in a base portion of the computing device, and send the second message over the second plurality of wires to traverse a hinge movably coupling the lid portion and the base portion, wherein the second plurality of wires includes fewer wires than the first plurality of wires.

Example C2 comprises the subject matter of Example C1, and the instructions, when executed by the first processor, cause the first processor to receive a third message according to a first human interface device (HID) communication protocol associated with a third plurality of wires connecting the first processor to a human interface device and the third message is to contain input data. The instructions when executed by the first processor are to cause the first processor further to generate a fourth message based on a second HID communication protocol and the fourth message is to contain the input data. The second message of the host communication protocol and the fourth message of the second HID communication protocol are to be multiplexed onto the second plurality of wires traversing the hinge.

Example C3 comprises the subject matter of Example C2, and the instructions, when executed by the first processor, cause the first processor further to, prior to generating the fourth message, extract the input data from the third message and run a touch optimization algorithm to optimize the input data.

Example C4 comprises the subject matter of any one of Examples C2-C3, and the instructions, when executed by the first processor, cause the first processor to, in response to receiving a first host power state command in a fifth message according to the second HID communication protocol via the second plurality of wires, identify a first HID power state command corresponding to the first host power state command based on power state command information, the power state command information including one or more HID power state commands associated with the human interface device mapped to one or more host power state commands associated with the second HID communication protocol.

Example C5 comprises the subject matter of any one of Examples C2-C4, and the second HID communication protocol is a HID over universal serial bus (HID over USB) protocol or a HID over peripheral component interconnect (PCIe) protocol (HID over PCIe).

Example C6 comprises the subject matter of any one of Examples C2-C5, and the first HID communication protocol is a HID over serial peripheral interface (HID over SPI) protocol or a HID over inter-integrated circuit (HID over I2C) protocol.

Example C7 comprises the subject matter of any one of Examples C1-C6, and to convert the first message to the second message is to include determining a transaction type of the first message, and encapsulating the first message, the transaction type of the first message, and a protocol type of the first message in a packet.

Example C8 comprises the subject matter of any one of Examples C1-C7, and the instructions, when executed by the first processor, cause the first processor to receive a sixth message from the second processor according to the host communication protocol and a seventh message based on a second I/O communication protocol is contained in the sixth message, convert the sixth message to the seventh message based on the second I/O communication protocol, and send the seventh message to a second I/O device of the plurality of I/O devices based on the second I/O communication protocol of the plurality of I/O communication protocols.

Example M1 provides a method comprising receiving, by a first processor in a first panel of a computing device, a first message based on a host communication protocol associated with a first plurality of wires connecting the first processor in the first panel of the computing device to a second processor in a second panel of the computing device. The method also comprises converting the first message to a second message based on a first input/output (I/O) communication protocol of a plurality of I/O communication protocols associated with a second plurality of wires connecting the first processor to a plurality of I/O devices in the first panel, and sending the second message to a first I/O device of the plurality of I/O devices on at least a first wire in the second plurality of wires according to the first I/O communication protocol. The second plurality of wires includes more wires than the first plurality of wires.

Example M2 comprises the subject matter of Example M1, and further comprises receiving, by the first processor, a third message based on a first human interface device (HID) communication protocol associated with the first plurality of wires connecting the first processor to the second processor and the third message contains output data, and generating a fourth message based on a second HID communication protocol associated with a third plurality of wires connecting the first processor to a human interface device (HID) in the first panel of the computing device and the fourth message contains the output data. The method further comprises sending the fourth message of the second HID communication protocol to the human interface device over the third plurality of wires.

Example M3 comprises the subject matter of Example M2, and further comprises, prior to generating the fourth message extracting the input data from the third message, and running a touch optimization algorithm to optimize the input data.

Example M4 comprises the subject matter of any one of Examples M2-M3, and further comprises, in response to receiving a first host power state command in a fifth message according to the second HID communication protocol via the second plurality of wires, identifying a first HID power state command corresponding to the first host power state command based on power state command information, the power state command information including one or more HID power state commands associated with the human interface device mapped to one or more host power state commands associated with the second HID communication protocol.

Example M5 comprises the subject matter of any one of Examples M2-M3, and the first HID communication protocol is a HID over universal serial bus (HID over USB) protocol or a HID over peripheral component interconnect (PCIe) protocol (HID over PCIe).

Example M6 comprises the subject matter of any one of Examples M2-M5, and the second HID communication protocol is a HID over serial peripheral interface (HID over SPI) protocol or a HID over inter-integrated circuit (HID over I2C) protocol.

Example M7 comprises the subject matter of any one of Examples M1-M6, and the converting the first message to the second message includes determining a protocol type of the second message, selecting the first I/O communication protocol for the second message based on the protocol type corresponding to the first I/O communication protocol, and decapsulating the first message to obtain the second message.

Example M8 comprises the subject matter of any one of Examples M1-M7, and further comprises receiving, by the first processor from the first I/O device of the plurality of I/O devices, a sixth message based on the first I/O communication protocol of the plurality of I/O communication protocols, converting the sixth message to a seventh message based the host communication protocol, and sending the seventh message to the second processor over the first plurality of wires connecting the first processor to the second processor.

Example W1 comprises the subject matter of any one of the above Examples, and the plurality of I/O communication protocols correspond to a plurality of low-speed communication protocols, and the host communication protocol corresponds to a high-speed communication protocol.

Example W2 comprises the subject matter of any one of the above Examples, and the first I/O communication protocol is one of a serial peripheral interface (SPI), a general peripheral input/output (GPIO), an inter-integrated circuit (I2C), or a universal asynchronous receiver-transmitter (UART).

Example W3 comprises the subject matter of any one of the above Examples, and the host communication protocol is either a universal serial bus (USB) or a peripheral component interconnect express (PCIe).

Example W4 comprises the subject matter of any one of the above Examples, and the plurality of I/O devices includes two or more of a camera, an electric shutter, a sensor, a microphone, and a light-emitting diode (LED).

The following examples pertain to embodiments in accordance with this specification. Example SS1 provides a system including a first processor in a lid portion of a computing device including a screen. The first processor is communicatively coupled to a first human interface device (HID) via a first number of wires according to a first HID communication protocol and a general peripheral input/output (GPIO) communication protocol. The first HID communication protocol is a human interface device over serial peripheral interface (HID over SPI) protocol. The system also includes a memory coupled to the first processor and the memory is to include instructions that, when executed by the first processor, cause the first processor to receive a first message according to the first HID communication protocol from the human interface device and the first message is to contain first input data, generate a second message based on a second HID communication protocol and the second message is to contain the first input data, and send the second message over a bus containing a second number of wires traversing a hinge movably coupling the lid portion to a base portion of the computing device, wherein the second number of wires is less than the first number of wires.

Example SS2 comprises the subject matter of Example S1, and the instructions, when executed by the first processor, cause the first processor further to receive an interrupt signal from the first human interface device indicating that one or more touch events on the first human interface device have been detected, and send a first request to the first human interface device to obtain the first input data. The first request is to be sent at least partly in response to receiving the interrupt signal.

Example SS3 comprises the subject matter of any one of Examples SS1-SS2, and the first processor is communicatively coupled to a second human interface device (HID) via a third number of wires according to a third HID communication protocol and the GPIO communication protocol, and the instructions, when executed by the first processor, cause the first processor further to receive a third message according to the third HID communication protocol from the second human interface device and the third message is to contain second input data, generate a fourth message according to the second HID communication protocol and the fourth message is to contain the second input data, and send the fourth message over the bus containing the second number of wires traversing the hinge, and the second number of wires is less than the third number of wires.

Example SS4 comprises the subject matter of Example SS3, and the third HID communication protocol is a HID over inter-integrated circuit (HID over I2C) protocol.

Example SS5 comprises the subject matter of any one of Examples SS1-SS4, and the instructions, when executed by the first processor, cause the first processor further to receive a fifth message from a second processor according to the second HID communication protocol and the fifth message is to contain output data for the first human interface device, generate a sixth message based on the HID over SPI protocol and the sixth message is to contain the output data, and send the sixth message to the first human interface device based on the HID over SPI protocol.

Example SS6 comprises the subject matter of any one of Examples SS1-SS5, and the instructions, when executed by the first processor, cause the first processor further to, prior to generating the second message, extract the first input data from the first message, and run a touch optimization algorithm to optimize the first input data.

Example SS7 comprises the subject matter of any one of Examples SS1-SS6, and the memory coupled to the first processor is to include power state command information, and the power state command information is to include one or more HID power state commands associated with the first human interface device mapped to one or more host power state commands associated with the second HID communication protocol.

Example SS8 comprises the subject matter of Example SS7, and the instructions, when executed by the first processor, cause the first processor further to, in response to receiving a first host power state command in a seventh message according to the second HID communication protocol via the second number of wires, identify from the power state command information, a first HID power state command corresponding to the first host power state command.

Example AA1 provides an apparatus, including a first processor, a first plurality of pins to support a first human interface device (HID) communication protocol and a general peripheral input/output (GPIO) protocol to communicatively couple the first processor to a first human interface device via a first plurality of wires, and the first human interface device is to be disposed in a first panel of a computing device, and the first HID communication protocol is a human interface device over serial peripheral interface (HID over SPI) protocol. The apparatus further includes a second plurality of pins to support a second HID communication protocol associated with a second plurality of wires to communicatively couple the first processor to a second processor in a second panel of the computing device, and memory coupled to the first processor, and the memory is to include instructions that, when executed by the first processor, cause the first processor to receive a first message according to the first HID communication protocol from the human interface device and the first message is to contain first input data, generate a second message based on the second HID communication protocol and the second message is to contain the first input data, and send the second message to the second processor over the second plurality of wires traversing a hinge movably coupling the first panel to the second panel, and the second plurality of wires includes fewer wires than the first plurality of wires.

Example AA2 comprises the subject matter of Example AA1, and the instructions, when executed by the first processor, cause the first processor further to receive an interrupt signal from the first human interface device indicating that one or more touch events on the first human interface device have been detected, and send a first request to the first human interface device to obtain the first input data, and the first request is to be sent at least partly in response to receiving the interrupt signal.

Example AA3 comprises the subject matter of any one of Examples AA1-AA2, and the first processor is communicatively coupled to a second human interface device (HID) via a third plurality of wires according to a third HID communication protocol and the GPIO communication protocol, and the instructions, when executed by the first processor, cause the first processor further to receive a third message according to the third HID communication protocol from the second human interface device and the third message is to contain second input data, generate a fourth message according to the second HID communication protocol, the fourth message to contain the second input data, and send the fourth message over the second plurality of wires traversing the hinge, and the second plurality of wires includes fewer wires than the third plurality of wires.

Example AA4 comprises the subject matter of Example AA3, and the third HID communication protocol is a HID over inter-integrated circuit (HID over I2C) protocol.

Example AA5 comprises the subject matter of any one of Examples AA1-AA4, and the instructions, when executed by the first processor, cause the first processor further to receive a fifth message from the second processor according to the second HID communication protocol and the fifth message is to contain output data for the first human interface device, generate a sixth message based on the HID over SPI protocol and the sixth message is to contain the output data, and send the sixth message to the first human interface device based on the HID over SPI protocol.

Example AA6 comprises the subject matter of any one of Examples AA1-AA5, and the instructions, when executed by the first processor, cause the second processor further to extract the first input data from the first message, and run a touch optimization algorithm to optimize the first input data.

Example AA7 comprises the subject matter of any one of Examples AA1-AA6, and the memory coupled to the first processor is to include power state command information, and the power state command information is to include one or more HID power state commands associated with the first human interface device mapped to one or more host power state commands associated with the second HID communication protocol.

Example AA8 comprises the subject matter of Example AA1, and the instructions, when executed by the first processor, cause the first processor further to, in response to receiving a first host power state command in a seventh message according to the second HID communication protocol via the second plurality of wires, identify from the power state command information, a first HID power state command corresponding to the first host power state command.

Example MM1 provides a method including receiving by a first processor in a lid portion of a computing device, from a first human interface device (HID) in the lid portion, a first message based on a first HID communication protocol associated with a first plurality of wires to connect the first processor to the first human interface device and the first HID communication protocol is a human interface device over serial peripheral interface (HID over SPI) protocol. The method further includes extracting first input data from the first message, generating a second message based on a second HID communication protocol and the second message is to contain the first input data, and sending the second message to a second processor in a base portion of the computing device over a second plurality of wires traversing a hinge that movably couples the lid portion to the base portion, and the second plurality of wires is to include fewer wires than the first plurality of wires.

Example MM2 comprises the subject matter of Example MM1, and further comprises receiving an interrupt signal from the first human interface device indicating that one or more touch events on the first human interface device have been detected, and sending a first request to the first human interface device to obtain the first input data, and the first request is sent at least partly in response to receiving the interrupt signal.

Example MM3 comprises the subject matter of any one of Examples MM1-MM2, and further comprises receiving a third message according to a third HID communication protocol from a second human interface device, and the second human interface device is communicatively coupled to the first processor via a third plurality of wires and the third message contains second input data, generating a fourth message according to the second HID communication protocol and the fourth message contains the second input data, and sending the fourth message over the second plurality of wires traversing the hinge, and the second plurality of wires includes fewer wires than the third plurality of wires.

Example MM4 comprises the subject matter of Example MM3, and the third HID communication protocol is a HID over inter-integrated circuit (HID over I2C).

Example MM5 comprises the subject matter of any one of Examples MM1-MM4, and further comprises receiving a fifth message from the second processor according to the second HID communication protocol and the fifth message contains output data for the first human interface device, generating a sixth message based on the HID over SPI protocol and the sixth message contains the output data, and send the sixth message to the first human interface device based on the HID over SPI protocol.

Example MM6 comprises the subject matter of any one of Examples MM1-MM5, and further comprises, prior to generating the second message, extracting the first input data from the first message, and running a touch optimization algorithm to optimize the first input data.

Example MM7 comprises the subject matter of any one of Examples MM1-MM6, and further comprises, in response to receiving a first host power state command in a seventh message according to the second HID communication protocol via the second plurality of wires, identifying a first HID power state command corresponding to the first host power state command based on power state command information, and the power state command information includes one or more HID power state commands associated with the first human interface device mapped to one or more host power state commands associated with the second HID communication protocol.

Example WW1 comprises the subject matter of any one of Examples SS1 through MM7, and the second HID communication protocol is a human interface device over universal serial bus (HID over USB) protocol or a peripheral component interconnect (PCIe) protocol.

Example WW2 comprises the subject matter of any one of the above Examples SS1 through MM7, and the first human interface device is a touch screen coupled to a touch controller, and the first input data represents one or more touch events on the touch screen detected by the touch controller.

Example X1 provides an apparatus, the apparatus comprising means for performing the method of any one of Examples M1-M8 or any one of Examples MM1-MM7.

Example X2 comprises the subject matter of Example X1 can optionally include that the means for performing the method comprises at least one processor and at least one memory element.

Example X3 comprises the subject matter of Example X2 can optionally include that the at least one memory element comprises machine readable instructions that when executed, cause the apparatus to perform the method of any one of Examples M1-M8 or any one of Examples MM1-MM7.

Example X4 comprises the subject matter of any one of Examples X1-X3 can optionally include that the apparatus is one of a microcontroller unit, a processor, a computing device, or a system-on-a-chip.

Example X5 provides at least one machine readable storage medium comprising instructions for secure reporting of platform state information, where the instructions when executed realize an apparatus, realize a system, or implement a method as in any one of the preceding Examples.

The invention claimed is:

1. A system comprising:

a first processor disposed within a lid portion of a computing device including a screen, the first processor communicatively coupled to a plurality of input/output (I/O) devices according to a plurality of I/O communication protocols via a first number of wires;

a second processor in a base portion of the computing device and communicatively coupled to the first processor by a bus containing a second number of wires, wherein the second number of wires is less than the first number of wires; and a first memory disposed within the lid portion and coupled to the first processor to store first instructions that, when executed by the first processor, cause the first processor to:

receive, from a first I/O device of the plurality of I/O devices, a first message according to a first I/O communication protocol of the plurality of I/O communication protocols;

convert the first message to a second message, wherein the second message is a packet according to a host communication protocol, wherein to convert the first message to the second message is to include encapsulating, in the packet, the first message according to the first I/O communication protocol, a transaction type of the first message, and a protocol type indicating the first I/O communication protocol of the first message encapsulated in the packet; and send the second message over the bus to the second processor, wherein the bus traverses a hinge movably coupling the lid portion to the base portion.

2. The system of claim 1, wherein the first processor is communicatively coupled to a human interface device (HID) according to a first HID communication protocol via a third number of wires.

3. The system of claim 2, wherein the first memory is to store second instructions that, when executed by the first processor, cause the first processor to:

receive a third message according to the first HID communication protocol from the human interface device, wherein the third message is to contain input data; and generate a fourth message according to a second HID communication protocol, the fourth message to contain the input data, wherein the second message of the host communication protocol and the fourth message of the second HID communication protocol are to be multiplexed onto the second number of wires traversing the hinge.

4. The system of claim 3, wherein the second instructions, when executed by the first processor, cause the first processor further to, prior to generating the fourth message:

extract the input data from the third message; and run a touch optimization algorithm to optimize the input data.

5. The system of claim 3, wherein the second HID communication protocol is a HID over universal serial bus (HID over USB) protocol or a HID over peripheral component interconnect (PCIe) protocol (HID over PCIe), and wherein the first HID communication protocol is a HID over serial peripheral interface (HID over SPI) protocol or a HID over inter-integrated circuit (HID over I2C) protocol.

6. The system of claim 1, wherein the second processor is coupled to a second memory, wherein the second memory is to store operating system instructions that, when executed by the second processor, cause the second processor to:

receive the second message from the first processor;

determine the protocol type of the first message encapsulated in the packet; and in response to determining that the protocol type of the first message encapsulated in the packet corresponds to the first I/O communication protocol, convert the second message to the first message according to the first I/O communication protocol.

7. The system of claim 6, wherein the operating system instructions, when executed by the second processor, are to cause the second processor further to:

determine that the second message is associated with a first logical function corresponding to the first instructions or a second logical function corresponding to second instructions stored in the first memory coupled to the first processor; and determine the protocol type of the first message encapsulated in the packet in response to determining that the second message is associated with the first logical function corresponding to the first instructions.

8. The system of claim 6, wherein the operating system instructions, when executed by the second processor, are to cause the second processor further to:

provide the first message according to the first I/O communication protocol to a virtual input/output (I/O) driver corresponding to the first I/O communication protocol to enable a software application running on the second processor to access the first message from one or more virtual pins exposed by the virtual I/O driver, wherein the one or more virtual pins are associated with the first I/O communication protocol.

9. The system of claim 1, wherein the first I/O communication protocol is one of a serial peripheral interface (SPI), a general peripheral input/output (GPIO), an inter-integrated circuit (I2C), or a universal asynchronous receiver-transmitter (UART), and wherein the host communication protocol is either a universal serial bus (USB) or a peripheral component interconnect express (PCIe).

10. The system of claim 1, wherein the plurality of I/O devices includes two or more of a camera, an electric shutter, a sensor, a microphone, and a light-emitting diode (LED).

11. An apparatus, comprising:

a first processor;

a first plurality of pins configured to be communicatively coupled to a plurality of input/output (I/O) devices by a first plurality of wires, wherein the plurality of I/O devices are disposed in a first portion of a computing device and are associated with a plurality of input/output (I/O) communication protocols, respectively;

a second plurality of pins configured to be communicatively coupled to a second processor by a second plurality of wires, wherein the second processor is disposed in a second portion of the computing device and is associated with a second communication protocol; and memory coupled to the first processor, the memory to store first instructions that, when executed by the first processor, cause the first processor to:

receive a first message from a first I/O device of the plurality of I/O devices according to a first I/O communication protocol of the plurality of I/O communication protocols;

convert the first message to a second message, wherein the second message is a packet based on the second communication protocol, wherein to convert the first message to the second message is to include encapsulating, in the packet, the first message according to the first I/O communication protocol, a transaction type of the first message, and a protocol type identifying the first I/O communication protocol of the first message encapsulated in the packet; and send the second message to the second processor via the second plurality of wires, wherein the second plurality of wires includes fewer wires than the first plurality of wires.

12. The apparatus of claim 11, further comprising:

a third plurality of pins to support a first human interface device (HID) communication protocol associated with a third plurality of wires to communicatively couple the first processor to a human interface device.

13. The apparatus of claim 12, wherein the memory is to store second instructions that, when executed by the first processor, cause the first processor to:

receive a third message according to the first HID communication protocol from the human interface device, wherein the third message is to contain input data; and generate a fourth message according to a second HID communication protocol, the fourth message to contain the input data, wherein the second message of the second communication protocol and the fourth message of the second HID communication protocol are to be multiplexed onto the second plurality of wires to traverse a hinge movably coupling the first portion to the second portion.

14. The apparatus of claim 13, wherein the second instructions, when executed by the first processor, cause the first processor to:

in response to receiving a first host power state command in a fifth message according to the second HID communication protocol via the second plurality of wires, identify a first HID power state command corresponding to the first host power state command based on power state command information, the power state command information including one or more HID power state commands associated with the human interface device mapped to one or more host power state commands associated with the second HID communication protocol.

15. The apparatus of claim 11, wherein the first I/O communication protocol is one of a serial peripheral interface (SPI), a general peripheral input/output (GPIO), an inter-integrated circuit (I2C), or a universal asynchronous receiver-transmitter (UART), and wherein the second communication protocol is one of a universal serial bus (USB) or a peripheral component interconnect express (PCIe).

16. The apparatus of claim 11, wherein the computing device includes a foldable screen disposed in the first portion and the second portion, the first portion and the second portion being foldable relative to each other.

17. The apparatus of claim 11, wherein the first portion is a lid portion including a screen, and wherein the second portion is a base portion movably connected to the lid portion.

18. One or more non-transitory machine readable media comprising instructions for execution that when executed by a first processor, cause the first processor to:

receive, from a first input/output (I/O) device of a plurality of I/O devices in a lid portion of a computing device including a screen, a first message according to a first I/O communication protocol of a plurality of I/O communication protocols associated with a first plurality of wires to connect the first processor to the plurality of I/O devices;

convert the first message to a second message, wherein the second message is a packet based on a host communication protocol associated with a second plurality of wires to connect the first processor to a second processor in a base portion of the computing device, wherein to convert the first message to the second message is to include encapsulating, in the packet, the first message according to the first I/O communication protocol, a transaction type of the first message, and a protocol type that indicates the first I/O communication protocol of the first message encapsulated in the packet; and send the second message over the second plurality of wires to traverse a hinge movably coupling the lid portion and the base portion, wherein the second plurality of wires includes fewer wires than the first plurality of wires.

19. The one or more non-transitory machine readable media of claim 18, wherein the first message according to the first I/O communication protocol is contained in a payload portion of the packet, the transaction type is contained in a metadata portion of the packet, and the protocol type is contained in the metadata portion of the packet.

20. The apparatus of claim 11, wherein the first message according to the first I/O communication protocol is contained in a payload portion of the packet, the transaction type is contained in a metadata portion of the packet, and the protocol type is contained in the metadata portion of the packet.

\* \* \* \* \*